US012397568B2

(12) United States Patent
Wakayama et al.

(10) Patent No.: US 12,397,568 B2
(45) Date of Patent: Aug. 26, 2025

(54) SHEET SUPPLY DEVICE, RECORDING DEVICE, AND CART

(71) Applicant: CANON KABUSHIKI KAISHA, Tokyo (JP)

(72) Inventors: Naoki Wakayama, Kanagawa (JP); Kenji Shimamura, Saitama (JP); Tomohiro Suzuki, Tokyo (JP); Ryosuke Murata, Tokyo (JP); Yujiro Ishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/106,074

(22) Filed: Feb. 6, 2023

(65) Prior Publication Data

US 2023/0249481 A1 Aug. 10, 2023

(30) Foreign Application Priority Data

Feb. 7, 2022 (JP) ................................ 2022-017460
Feb. 28, 2022 (JP) ................................ 2022-029174

(51) Int. Cl.
*B41J 15/04* (2006.01)
*B65H 16/06* (2006.01)

(52) U.S. Cl.
CPC ............ *B41J 15/046* (2013.01); *B65H 16/06* (2013.01)

(58) Field of Classification Search
CPC ......... B41J 15/04; B41J 15/046; B65H 16/06; B65H 18/02; B65H 18/021; B65H 18/023; B65H 2301/41346; B65H 2301/4134; B65H 2405/422
See application file for complete search history.

(56) References Cited

U.S. PATENT DOCUMENTS 3,743,198 A * 7/1973 Lucas .................. B65H 19/126 242/596.1
5,697,575 A * 12/1997 Moore ............... B65H 19/1863 242/555.3
5,934,604 A * 8/1999 Klimek ................ B65H 19/126 242/558
10,239,334 B2 * 3/2019 Torigoe .................... B41J 15/04
10,703,117 B2 7/2020 Eiyama et al.
11,718,113 B2 * 8/2023 Murata .................... B41J 15/02 347/101
2012/0205418 A1 * 8/2012 Horie ..................... B41J 11/001 226/168
2022/0105738 A1 4/2022 Murata et al.
2022/0169470 A1 6/2022 Asano et al.

FOREIGN PATENT DOCUMENTS

JP 6054757 B2 12/2016
JP 6217336 B2 10/2017

* cited by examiner

*Primary Examiner* — Leslie A Nicholson, III
(74) *Attorney, Agent, or Firm* — Venable LLP

(57) ABSTRACT

A sheet supply device that supplies a sheet from a roll, includes: a first roll support portion which rotatably supports the roll on one end side in a width direction of the roll; a second roll support portion which rotatably supports the roll on the other end side of the roll by opposing the first roll support portion; and a guide portion which extends in the width direction and movably supports the second roll support portion in the width direction; wherein below a first space in which the roll between the first roll support portion and the second roll support portion is installed, a second space into which a cart which transports the roll enters is formed.

13 Claims, 33 Drawing Sheets

1200
1003
1012
X
Y
Z
1021
1011
R
1011
1022

1200
1003
1011
1012
X
Y
Z
1021
1011
R
1022

1200
1003
1012
X
Y
Z
1021
1011
R
1011
1022
T

SHEET SUPPLY DEVICE, RECORDING DEVICE, AND CART

BACKGROUND OF THE INVENTION

Field of the Invention

The present invention relates to a roll attachment mechanism which attaches a roll to a recording device which performs recording on a sheet while supporting the roll, around which a continuous sheet is wound, by a cart, the recording device, and the cart.

Description of the Related Art

In a recording device which performs a print operation on a sheet supplied from a roll, the roll is set on the device prior to sheet supply. As a device which supports the roll, such a configuration that includes a pair of holders which rotatably holds a paper core of the roll is known. In such configuration, the holder is moved in a width direction of the roll and inserted into the paper core of the roll so that the roll is set on the recording device. Here, when the roll is transported to the recording device prior to the setting of the roll, since particularly a roll with a high weight cannot be carried directly by hands, the roll is placed on a cart which supports the roll from below for the transportation in many cases as in Japanese Patent No. 6217336.

SUMMARY OF THE INVENTION

The present invention has an object to improve workability of roll attachment.

In order to achieve the object described above, a sheet supply device according to the present invention is a sheet supply device that supplies a sheet from a roll, including:

a first roll support portion which rotatably supports the roll on one end side in a width direction of the roll;

a second roll support portion which is provided to face the first roll support portion and rotatably supports the roll on the other end side of the roll; and a guide portion which extends in the width direction and movably supports the second roll support portion in the width direction, wherein below a first space in which the roll between the first roll support portion and the second roll support portion is installed, a second space into which a cart which transports the roll enters is formed.

Moreover, in order to achieve the object described above, the cart according to the present invention is a cart which supports the roll when the roll around which the sheet is wound is to be attached to the recording device, including:

a roll receiving portion which supports the roll from below;

a positioned portion whose position in a crossing direction crossing a width direction of the roll with respect to the recording device is determined by a positioning portion provided in the recording device; and a position adjustment mechanism capable of adjusting a position in the width direction of the roll supported by the roll receiving portion in a state in which the positioned portion is positioned by the positioning portion.

According to the present invention, workability of roll attachment can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

Recording devices which support rolls include a recording device which can handle a plurality of types of rolls with different widths. In a recording device of this type, rolls with various widths are supported by a holder by moving the holder in a width direction. However, in such a configuration that an insertion portion in a cantilever state is extended/contracted and holds the roll, when a roll with a particularly small width is to be supported, a protruding amount of the insertion portion becomes long and is easily deflected and thus, it is not appropriate to handle roll widths in a wide range. Moreover, when the roll is disposed in the roll width direction with a shift with respect to an object support body, the roll interferes with an external device when it is transported by an object conveyance cart, and a position of the roll with respect to the object support body needs to be adjusted. A labor for adjusting the position of the roll with respect to the support body has poor workability particularly when a heavy roll is handled. Thus, first, in a work of mounting/removing the roll on/from the recording device while supporting the roll by the cart, a recording device, a cart, and a roll support mechanism, which widen a range of the roll widths that can be handled and can improve workability, will be described.

First Embodiment

Recording Device

First, a basic configuration of a recording device 100 which constitutes a roll attachment mechanism according to a first embodiment of the present invention will be described by referring to FIGS. 1 to 3. As the recording device, an inkjet recording device including a sheet supply device which supplies a sheet as a print medium and a print portion which prints an image on the sheet will be described as an application example. Moreover, "ink" in this description is used as a collective name of liquids such as a recording liquid. Furthermore, when the same or corresponding members are provided in plural in the same figure of various devices which will be described below, suffixes such as a, b are added in illustration, but if there is no need for discrimination in the description, the suffixes such as a, b are omitted in description in some cases.

Figure 1:
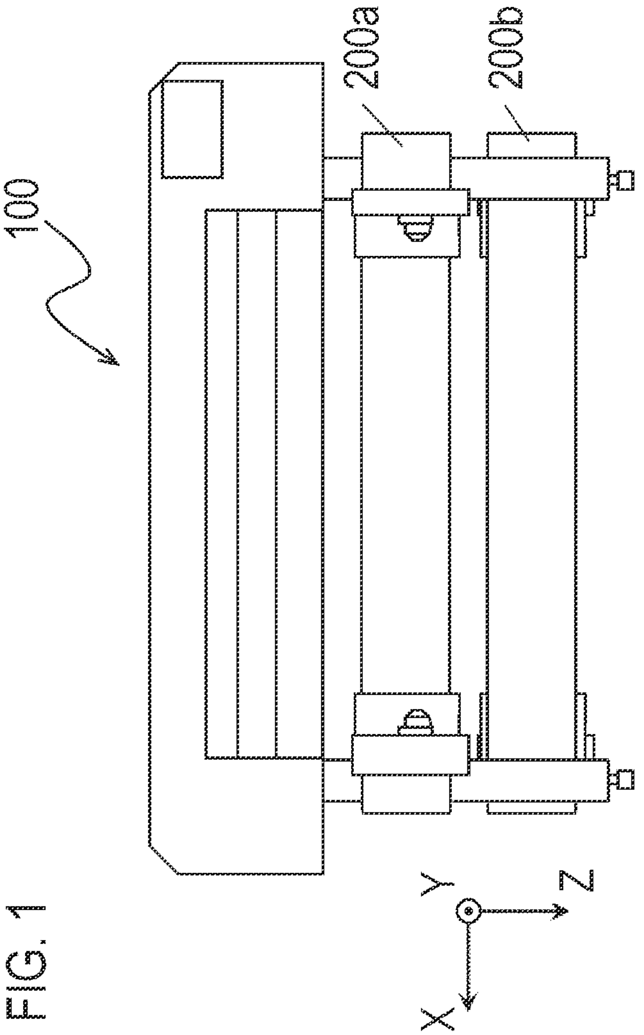
FIG. 1 is a front view of a recording device.

FIG. 1 is a front view of the recording device 100. The recording device 100 includes a roll set portion 200*a* on a paper-feed side and a roll set portion 200*b* on a take-up side, which can support a roll around which a sheet is wound in a roll state. The recording device 100 can print an image on the sheet fed from the roll supported by the roll set portion 200*a* and take up the printed sheet by the roll set portion 200*b*. A user can input various commands and the like such as size specification of the roll, setting of a roll type and the like to the recording device 100 by using various switches provided on a control panel. As shown in FIG. 1, in the following description, a width direction of the roll supported by the recording device 100 is defined as an X-axis direction, a crossing direction crossing the width direction is a Y-axis direction, and a gravity direction as a Z-axis direction, respectively. In this embodiment, the X-axis direction, the Y-axis direction, and the Z-axis direction are orthogonal to one another.

Figure 2:
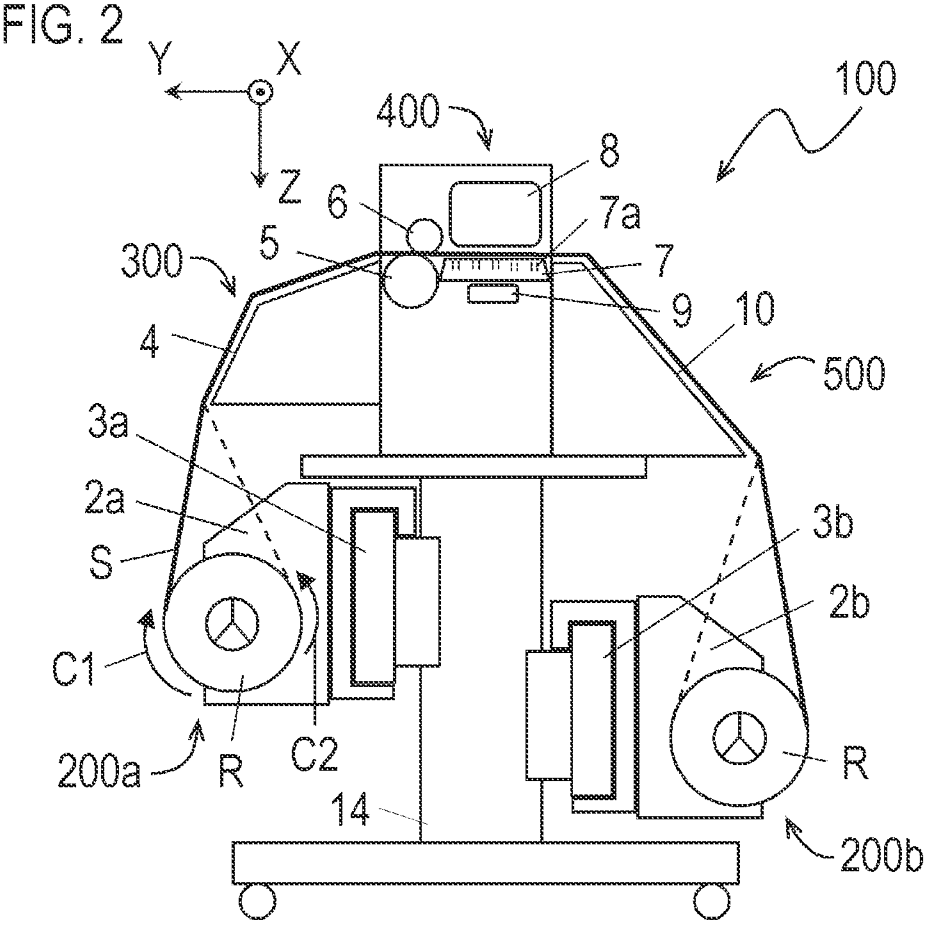
FIG. 2 is a schematic sectional view of the recording device illustrating a conveyance path of a sheet.

FIG. 2 is a schematic sectional view of the recording device 100 illustrating a conveyance path of a sheet S. The sheet S pulled out of a roll R set on (attached to) the roll set portion 200*a* is connected to the roll set portion 200*b* and is taken up. Each of the roll set portions 200 includes a roll holder 2 and a holder guide 3 as a guide portion. The roll set portion 200, the roll holder 2, and the holder guide 3 provided on the paper-feed side and the take-up side, respectively, are given "a" at the end of the sign of the members on the paper-feed side and "b" at the end of the sign of the members on the take-up side and will be described by discriminating them as necessary.

The sheet S pulled out of the roll R set on the roll set portion 200*a* is conveyed by an upstream sheet conveying portion 300 to a print portion 400 capable of printing an image. In the print portion 400, the image is printed on the sheet S by ejecting the ink from an inkjet type printhead 8.

The printhead 8 ejects the ink from an ejection port by using an ejection energy-generating element such as an electricity-heat conversion element (heater), a piezo element and the like. When the electricity-heat conversion element is used, the ink is foamed by heat generation thereof, and the ink can be ejected from the ejection port by using the foaming energy. In an application of the present invention, the printhead 8 is not limited only to an inkjet type. Moreover, a print method of the print portion 400 is not limited, either, and it may be a serial scan type, a full-line type and the like, for example. In the case of the serial scan type, the image is printed with a conveying operation of the sheet S and scanning of the printhead 8 in a direction crossing the conveying direction of the sheet S. In the case of the full-line type, the printhead 8 which is lengthy and extends in the direction crossing the conveying direction of the sheet S is used, and an image is printed while the sheet S is continuously conveyed.

The roll R is held at a center part by the roll holder 2 and is rotated in arrow C1, C2 directions by a roll drive motor, not shown. By enabling driving in both directions of forward rotation and reverse rotation, print can be performed selectively on a front surface or a back surface of the sheet S as shown by a path indicated by a solid line and a dotted line continuing from the roll set portion 200*a* on the paper-feed side in FIG. 2 to the upstream sheet conveying portion 300. Similarly, the printed surface of the sheet S can be selectively taken up on an outer side or an inner side as shown by a path indicated by a solid line and a dotted line continuing from the downstream sheet conveying portion 500 in FIG. 2, which will be described later, to the roll set portion 200*b* on the take-up side.

An upstream conveyance guide 4 of the upstream sheet conveying portion 300 guides the sheet S to the print portion 400 while guiding the front surface or the back surface of the sheet S pulled out of the roll set portion 200*a*. A conveyance roller 5 is rotated forward or reversely by a conveyance-roller drive motor. A nip roller 6 is capable of being driven/rotated in accordance with rotation of the conveyance roller 5. A conveying speed of the sheet S by the conveyance roller 5 is set higher than a pulling-out speed of the sheet S by the rotation of the roll R, whereby a back tension is given to the sheet S so that the sheet S can be conveyed in a state in which a tension remains to be applied to the sheet S. As a result, sagging of the sheet S is prevented, and occurrence of a crease in the sheet S and occurrence of a conveyance error can be suppressed.

A platen 7 in the print portion 400 adsorbs a surface on a side opposite to a recording surface of the sheet S through a suction hole 7*a* by a negative pressure generated by a suction fan 9. As a result, by regulating the position of the sheet S so that it goes on the platen 7, high-precision print of an image by the printhead 8 is made possible.

A downstream conveyance guide 10 of the downstream sheet conveying portion 500 leads the sheet S to the roll set portion 200*b* while guiding the front surface or the back surface of the sheet S pulled out of the print portion 400. By fixing a distal end of the sheet S to a paper core which is set on the roll set portion 200*b* and by rotating the set paper core in accordance with the conveying speed of the conveyance roller 5, the sheet S printed by the print portion 400 can be continuously taken up.

The recording device 100 includes a stand 14 on both end parts in the width direction, respectively. The stand 14 supports weights of the upstream sheet conveying portion 300, the print portion 400, and the downstream sheet conveying portion 500 on an upper part of a main body and supports the weight of the roll R through the roll set portion 200. The stand 14 is in contact with a floor surface and releases the weight of the recording device 100 to the floor surface.

Figure 3:
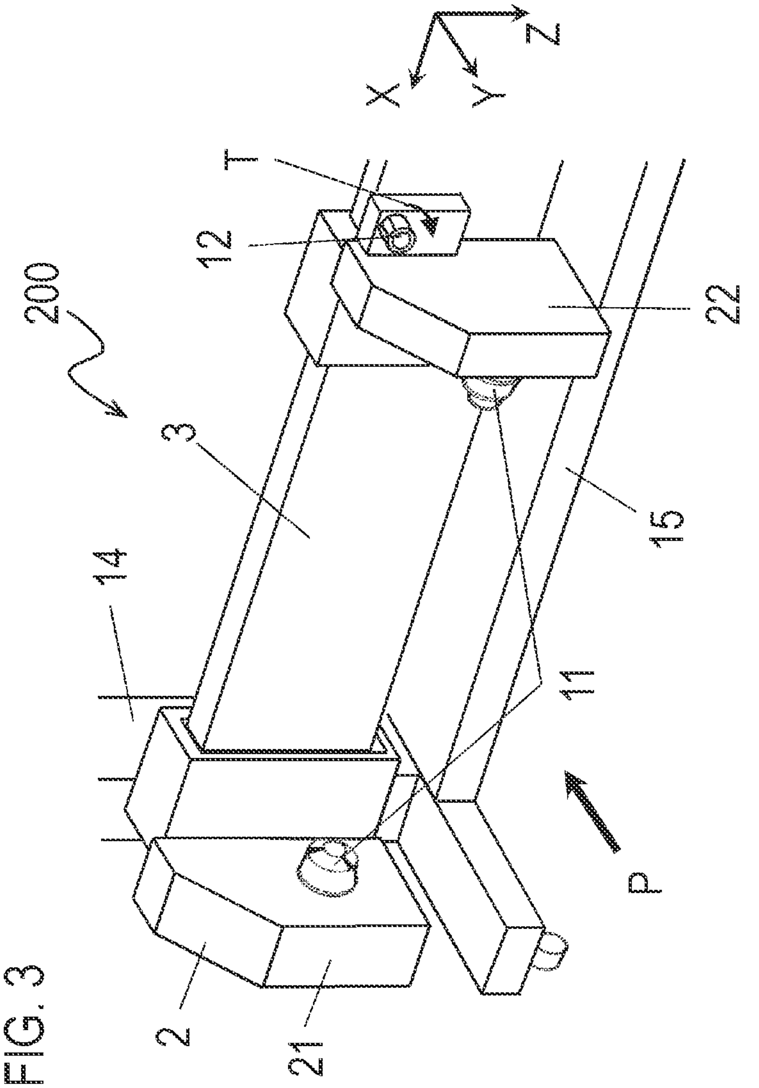
FIG. 3 is a perspective view of a roll set portion according to a first embodiment.

FIG. 3 is a perspective view of the roll set portion 200 of the recording device 100 according to a first embodiment. Into a hollow hole portion of the paper core of the roll R, a shaft-shaped paper-core fixing portion 11 provided on the roll holder 2 is inserted. The paper-core fixing portion 11 is rotated forward or reversely and driven by a roll drive motor, not shown. The roll holder 2 provided on the roll set portion 200 is constituted by a reference roll holder 21 and a non-reference roll holder 22, which make a pair as a roll support portion. On each of the reference roll holder 21 and the non-reference roll holder 22, the paper-core fixing portion 11 is rotatably mounted. The non-reference roll holder 22 is held slidably in the width direction (X-direction) of the roll R by the holder guide 3. Moreover, in the non-reference roll holder 22, a lock mechanism 12 is provided, and by turning a knob provided in the lock mechanism 12 in a T-direction, the non-reference roll holder 22 can be fixed at an arbitrary position in the width direction with respect to the holder guide 3. Though the reference roll holder 21 is also held by the holder guide 3, a slide mechanism is not indispensable. A friction member is provided in the paper-core fixing portion 11, and when the roll R is set, the roll R and the paper-core fixing portion 11 are integrally rotated.

By holding the roll R by using the slide mechanism by the roll holder 2 and the holder guide 3, the roll R is firmly supported by the roll set portion 200 regardless of the roll width. That is, the recording device 100 is so configured that the roll R with an arbitrary width not larger than a width-direction length of the holder guide 3 can be set. Moreover, if it is so configured that the reference roll holder 21 is fixed to the holder guide 3 so as not to slide, the end part of the roll R is fitted with the fixed reference roll holder 21 and thus, it is configured such that a reference-side end-part position of the roll R is determined constant with respect to the roll set portion 200.

The holder guide 3 of this embodiment is fixed to the stand 14. Moreover, a roll holder 2*a* on the paper-feed side is configured to be disposed on a front side of the recording device (Y-positive direction) with respect to the holder guide 3*a*. That is, the holder guide 3*a* is disposed on a main-body depth side (Y-negative direction) with respect to the paper-core fixing portion 11. By configuring as above, since there is no structure such as the holder guide 3 on a main-body front side or on a main-body lower side of the paper-core fixing portion 11 with respect to the roll holder 2*a* on the paper-feed side, there is no obstacle in the mounting/removing work of the roll R. Therefore, in the recording device 100, by placing the roll R on the cart and moving the cart from a P-direction shown in FIG. 3, the roll R can be set. The recording device 100 further includes an abutting surface 15 as a positioning portion which determines a position of the cart in the crossing direction (Y-direction), which is located lower than the holder guide 3 and extends between the stands 14. Moreover, the roll holder 2*b* on the take-up side is configured to be disposed on a back-surface side of the recording device (Y-negative direction) with respect to the holder guide 3*b*, and workability of mounting/removing of the roll R is favorable. Details of a positioning method in the crossing direction of the cart will be described later.

Cart

Figure 4:
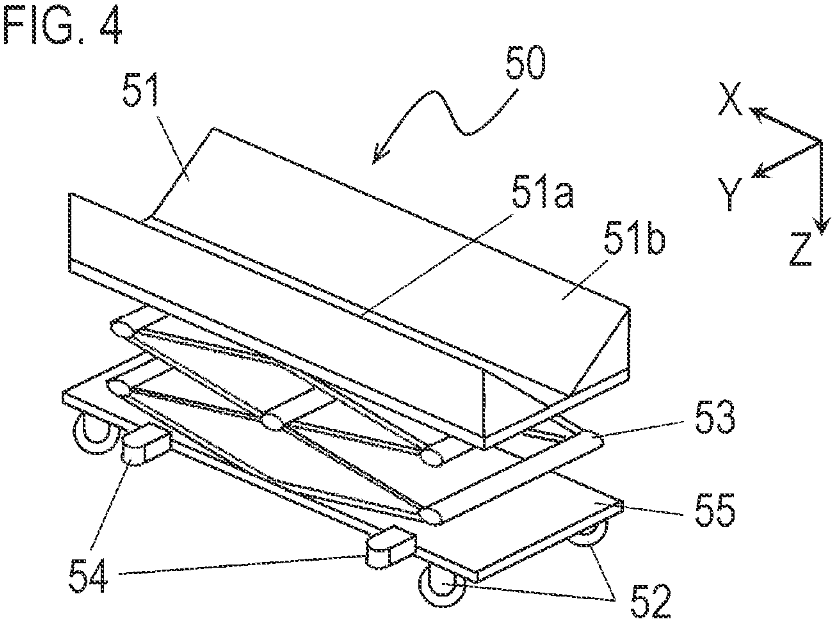
FIG. 4 is a perspective view of a cart according to the first embodiment.

Subsequently, the cart 50 according to the first embodiment, which supports and conveys the roll R when the roll R is mounted on the roll holder 2, will be described by referring to FIG. 4. FIG. 4 is a perspective view of the cart 50 according to the first embodiment. The cart 50 includes a receiving portion 51 which supports the roll R, a wheel portion 52, a height adjustment portion 53 which adjusts a height of the receiving portion 51, a cart base portion 55 which supports the receiving portion 51 through the height adjustment portion 53, and an abutting portion 54 which protrudes in the crossing direction from the cart base portion 55.

The receiving portion 51 as a roll receiving portion can support the roll R from below in a state in which the width direction of the roll R is horizontal, that is, with the same attitude as that of the roll R, when the roll IR is mounted on the roll holder 2. The receiving portion 51 has receiving-portion inclined surfaces 51*a*, 51*b* as two inclined surfaces in contact with the roll R from below. When the receiving portion 51 is viewed from the width direction, the two receiving-portion inclined surfaces 51*a*, 51*b* form a V-shape. In a state in which the roll R is placed on the receiving portion 51, the roll R is in contact with both the receiving-portion inclined surfaces 51*a*, 51*b*, and the receiving-portion inclined surfaces 51*a*, 51*b* are located symmetrically to a center of the roll R. That is, even if a winding diameter of the roll R is different, a position in the crossing direction (Y-direction) of the circumference center of the roll R to the cart 50 is the same position at all times.

The cart 50 is freely movable on the floor by the wheel portion 52 provided below the cart base portion 55. The height adjustment portion 53 provided on a lower side of the receiving portion 51 is constituted so as to be capable of extension/contraction in a vertical direction (Z-direction) and elevates up/down the receiving portion 51. The abutting portion 54 is brought into contact with the abutting surface 15 between the stands 14 when the cart 50 on which the roll R is placed is inserted into the recording device 100 and determines a cross-direction position of the cart 50 with respect to the stands 14.

Roll Attaching Method

Subsequently, details of a method of mounting the roll Ron the roll holder 2 by using the cart 50 will be described by referring to FIGS. 5A to 5D, and 6. The roll attachment mechanism according to the present invention is constituted by the recording device and the cart. In the following, a mounting/removing work of the roll R to/from the roll holder 2*a* on the paper-feed side will be described as an example, but the roll R can be mounted on/removed from the roll holder 2*b* on the take-up side with the similar method.

Figure 5B:
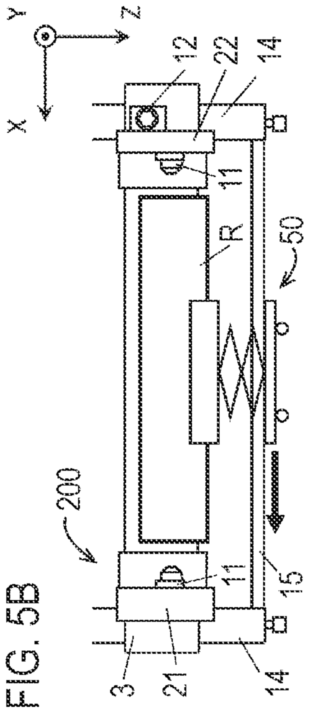
FIGS. 5A to 5D are diagrams illustrating a roll setting procedure according to the first embodiment.
Figure 5D:
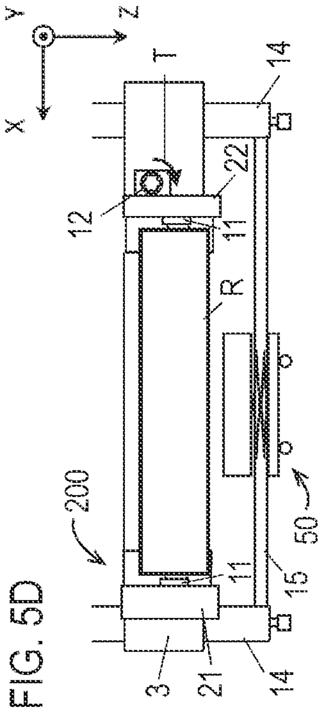
Figure 5A:
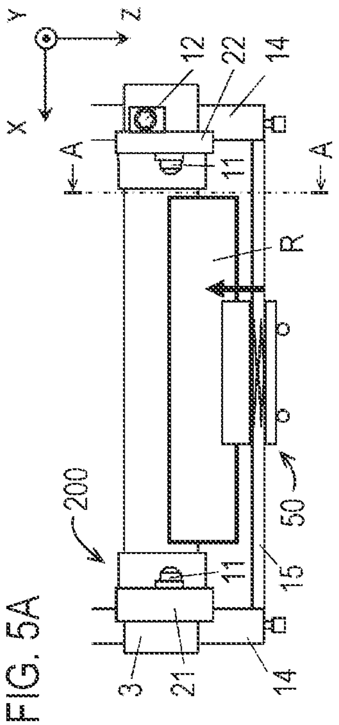
Figure 5C:
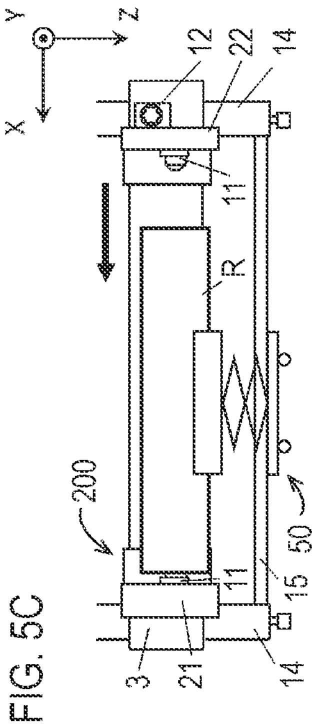
Figure 6:
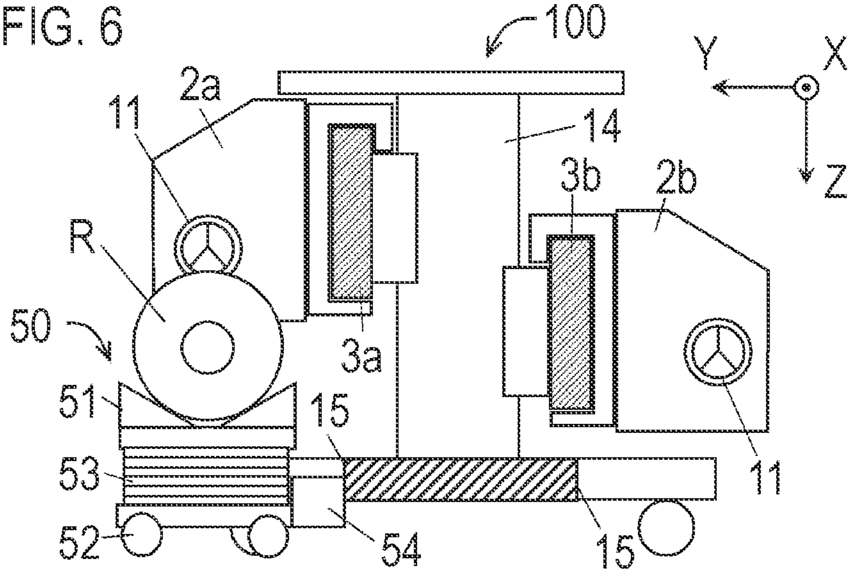
FIG. 6 is a schematic sectional view of a recording device and the cart according to the first embodiment.

FIGS. 5A to 5D are front views illustrating a procedure of setting the roll on the roll set portion 200 by using the cart 50 in the first embodiment. FIG. 5A illustrates a state of positioning of the roll R in the vertical direction after the cart 50 has been moved to a space between the opposing paper-core fixing portions 11. FIG. 5B illustrates a state in which the cart 50 on which the roll R is placed is moved to the reference roll holder 21 side. FIG. 5C illustrates a state in which the non-reference roll holder 22 is moved to the roll R side while one end in the width direction of the roll R is in contact with the paper-core fixing portion 11. FIG. 5D illustrates a state in which the non-reference roll holder 22 is fixed by the lock mechanism 12, and the support of the roll R is completed. FIG. 6 is an A-A sectional view in FIG. 5A and is a schematic sectional view illustrating a positional relationship of the recording device 100 and the cart 50.

When the roll R placed on the receiving portion 51 of the cart 50 is to be set on the roll set portion 200, first, the cart 50 is moved so that the roll R is positioned in a region sandwiched by the two roll holders 2. Then, as shown in FIG. 6, by bringing the abutting portion 54 of the cart 50 into contact with the abutting surface 15, the crossing-direction (Y-direction) position of the cart 50 with respect to the roll set portion 200 is determined. That is, the abutting portion 54 as the positioned portion is brought into contact with the abutting surface 15 as the positioning portion, whereby the position in the crossing direction of the abutting portion 54 is determined with respect to the abutting surface 15. Moreover, since movement in the width direction (X-direction) of the abutting portion 54 to the abutting surface 15 is not limited, the wheel portion 52 functions as the position adjustment mechanism of the roll, and the cart 50 can be moved in the width direction with the roll R supported while being positioned in the crossing direction. Therefore, the position in the width direction of the roll R can be adjusted while the roll R is positioned in the crossing direction with respect to the recording device 100.

The abutting surface 15 is provided in both directions of the paper-feed side and the take-up side with respect to the stands 14 and extends in the region in the width direction between the two stands 14. Therefore, as long as the cart 50 is located between the two stands 14, the abutting portion 54 can be brought into contact with the abutting surface 15 regardless of the position in the width direction. It is configured such that, when the abutting portion 54 is brought into contact with the abutting surface 15, a distance from a contact surface of the abutting portion 54 to the center of the roll R and a distance from the abutting surface 15 to a center of the paper-core fixing portion 11 have the same length in the crossing direction. In other words, in a state in which the abutting portion 54 is in contact with the abutting surface 15, positions in the crossing direction of the center of the roll R and the center of the paper-core fixing portion 11 match each other. Moreover, since the receiving portion 51 is configured such that the crossing-direction position of the center of the roll R with respect to the cart 50 is the same position at all times regardless of the winding diameter of the roll R, the crossing-direction position of the roll R with respect to the paper-core fixing portion 11 can be determined without being influenced by the winding diameter.

After the crossing-direction position of the roll R is determined by the positioning portion and the positioned portion, as in FIG. 5A, the height of the center of the roll R and the height of the paper-core fixing portion 11 in the recording device 100 are matched with each other, and positioning in the vertical direction is performed. The height adjustment portion 53 is provided on the cart 50, and the height of the roll R (Z-direction position) is adjusted by using this. Subsequently, as in FIG. 5B, the one end of the paper core of the roll R is inserted into the paper-core fixing portion 11 of the reference roll holder 21 by moving the cart 50 in the width direction, Since the center of the roll R matches the center of the paper-core fixing portion 11 both at the crossing-direction position and the vertical-direction position by the operations so tar, the paper core can be easily inserted into the paper-core fixing portion 11. When the one end of the paper core of the roll R is brought into contact with the paper-core fixing portion 11, the friction member of the paper-core fixing portion 11 is fitted in the paper core of the roll R. As a result, the roll R is fixed to the paper-core fixing portion 11 of the reference roll holder 21. Moreover, as in FIG. 5C, by sliding the non-reference roll holder 22 in the width direction so as to get closer to the roll R, the other end of the paper core of the roll R is inserted into the paper-core fixing portion 11 of the non-reference roll holder 22. As a result, similarly to the reference roll holder 21, the roll IR is fixed to the paper-core fixing portion 11 of the non-reference roll holder 22, and the width-direction position of the roll R is determined. Lastly, as in FIG. 5D, the non-reference roll holder 22 is fixed to the holder guide 3 by using the lock mechanism 12. As a result, sliding of the non-reference roll holder 22 in the paper width direction, which causes removal of the roll R from the roll holder 2, is prevented. Subsequently, by elevating the receiving portion 51 downward and by retreating it from the roll R by the height adjustment portion 53 of the cart 50, setting of the roll R on the recording device 100 is completed.

The setting procedure of the roll R on the roll set portion 200 has been described so far, and by performing this setting procedure in a reverse order, the roll R can be removed from the roll set portion 200. By configuring such that the cart can be used for the removal of the roll R, operations from the removal of the roll from the recording device to the conveyance of the roll R can be performed without unloading the roll R from the cart.

As described above, according to the roll attachment mechanism according to this embodiment, the operations from the conveyance of the roll to the mounting of the roll on the recording device or from the removal of the roll from the recording device to the conveyance can be performing without unloading the roll from the cart even once. When the roll is mounted/removed, the weight of the roll is always supported by the cart and thus, the roll can be mounted/removed easily without manually supporting the weight of the roll. Moreover, by means of the slide mechanism of the roll holder and the cart which is freely movable in the width direction even in the state of being positioned in the crossing direction, the configuration can deal with a wide range of roll widths. Moreover, during the mounting/removing works of the roll, the cart can be moved in the width direction in the state in which the cart is positioned in the crossing direction. Therefore, when the roll is to be loaded on the cart, a degree of freedom in the width-direction position of the roll with respect to the cart is high, and there is no need to manually position the heavy roll and thus, workability of mounting/removal of the roll is favorable.

Second Embodiment

Subsequently, a second embodiment will be described by referring to FIGS. 7 and 8. In the second embodiment, a method of determining the crossing-direction position of the cart with respect to the recording device is different from that of the first embodiment. Note that a difference from the first embodiment is mainly described in the following, while the other identical configurations are given the same signs, and the description thereof is omitted.

Figure 7:
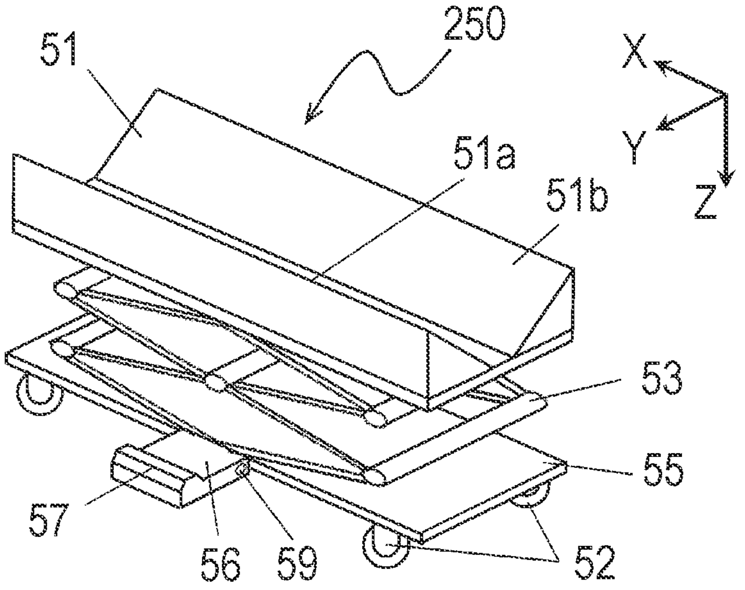
FIG. 7 is a perspective view of a cart according to a second embodiment.
Figure 8:
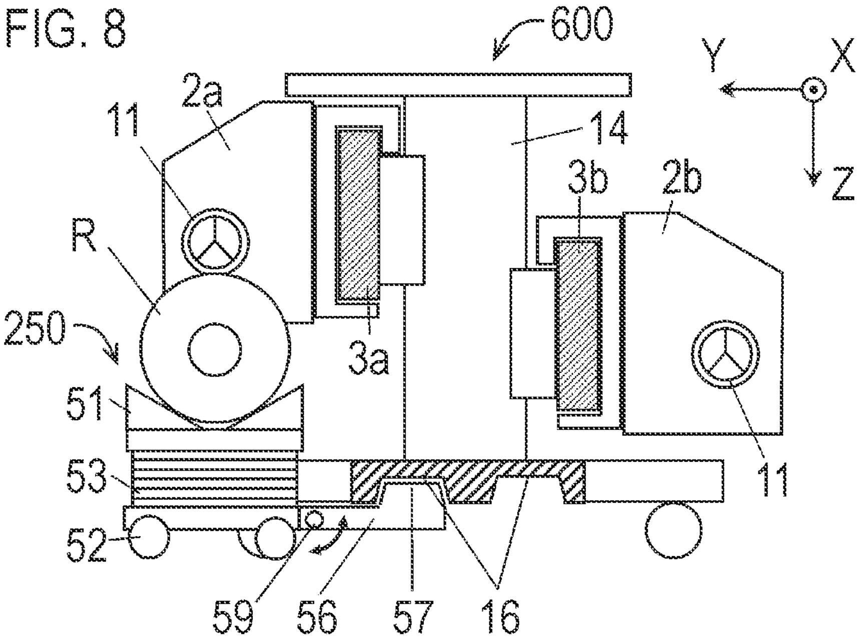
FIG. 8 is a schematic sectional view of a recording device and the cart according to the second embodiment.

FIG. 7 is a perspective view of a cart 250 in the second embodiment. FIG. 8 is a schematic sectional view when the cart 250 and a recording device 600 are viewed in the positional relationship similar to that in FIG. 6. The cart 250 includes a coupling lever 56 and a swing shaft 59 as a lever mechanism, and a coupling portion 57 is disposed at a distal end of the coupling lever 56. The coupling lever 56 is swingable around the swing shaft 59. Moreover, between the two stands 14, a coupling rail 16 extending in the width direction (X-direction) is provided. The recording device 600 and the cart 250 are coupled by fitting of the coupling portion 57 in the coupling rail 16, and the crossing-direction (Y-direction) position of the cart 250 with respect to the recording device 600 is determined. The coupling lever 56 can be changed to a first attitude fitted with the coupling rail 16 and a second attitude in which the fitting with the coupling rail 16 is released by swinging around the swing shaft 59. Moreover, in this embodiment, when the position of the coupling portion 57 in the crossing direction is determined by the coupling rail 16, movement of the cart 250 in a direction separated away from the recording device 600 is also limited.

The coupling rail 16 extends to a region between the two stands 14 in the width direction. Therefore, as long as the cart 250 is located between the two stands 14, the cart 250 can be coupled with the recording device 600 regardless of the position in the width direction. Here, in the crossing direction, it is so configured that a distance from the coupling portion 57 to the center of the roll R and a distance from the coupling rail 16 to the center of the paper-core fixing portion 11 have the same length. That is, in the state in which the coupling portion 57 and the coupling rail 16 are coupled, the crossing-direction positions of the center of the roll R and the center of the paper-core fixing portion 11 match each other. That is, in this embodiment, the coupling rail 16 functions as the positioning portion, and the coupling portion 57 as the positioned portion.

In the second embodiment, the procedure of setting the roll R on the roll set portion 200 by using the cart 250 and the procedure of removing the roll R from the roll set portion 200 are similar to FIGS. 5A to 5D illustrated in the description of the first embodiment.

When the roll R placed on the receiving portion 51 of the cart 250 is to be set on the roll set portion 200, first, the cart 250 is moved so that the roll R is positioned in a region sandwiched by the two roll holders 2. By moving the cart 250 in the crossing direction so as to get closer to the recording device 600, the coupling lever 56 swings around the swing shaft 59, the coupling portion 57 is fitted in the coupling rail 16, and the crossing-direction position of the cart 250 with respect to the recording device 600 is determined. As described above, in the second embodiment, by causing the coupling portion 57 to be coupled with the coupling rail 16, the cart 250 can be freely moved in the width direction while the crossing-direction position of the cart 250 with respect to the recording device 600 is fixed. That is, the cart 250 can be moved in the width direction while the state in which the crossing-direction positions of the center of the roll R and the center of the paper-core fixing portion 11 match each other is maintained.

As described above, according to this embodiment, in the state in which the crossing-direction position of the roll with respect to the recording device is determined, the roll can be mounted on the roll holder which is slidable in the width direction by adjusting the width-direction position of the roll easily by the position adjustment mechanism. Therefore, in the mounting/removing work of the roll, a wide range of the roll widths can be handled, and the workability is improved.

Third Embodiment

Subsequently, a third embodiment will be described by referring to FIGS. 9, and 10A to 10D. In the third embodiment, when the roll is to be se on the recording device, a method of inserting a paper core of the roll in the paper-core fixing portion is different from that of the first embodiment. Note that a difference from the first embodiment is mainly described in the following, while the recording device 100 and other identical configurations are given the same signs, and the description thereof is omitted.

Figure 9:
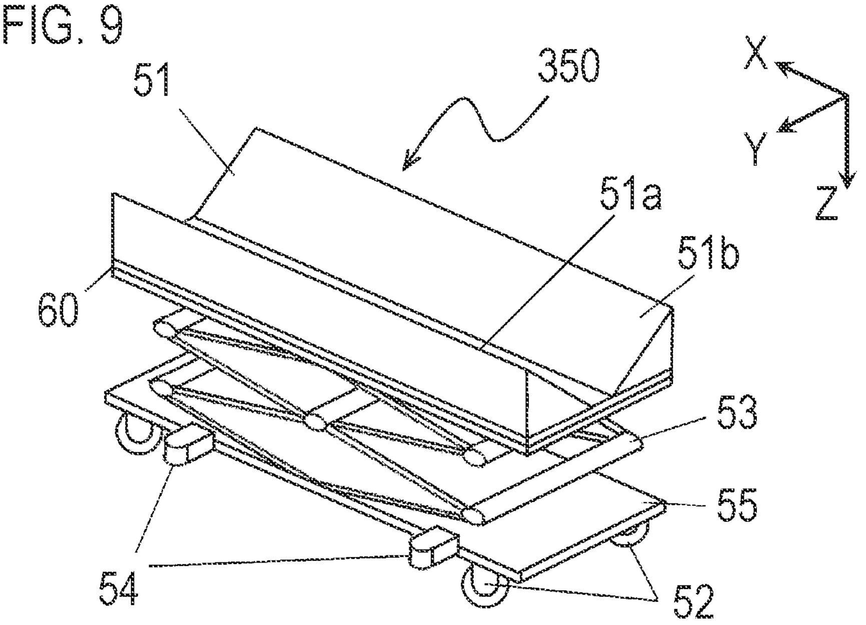
FIG. 9 is a perspective view of a cart according to a third embodiment.

FIG. 9 is a perspective view of a cart 350 in the third embodiment. As shown in FIG. 9, the cart 350 in this embodiment includes a slider 60 on a lower part of the receiving portion 51, By means of the slider 60 as the position adjustment mechanism of the roll R, the receiving portion 51 can slide in the width direction (X-direction) with respect to the wheel portion 52 and the cart base portion 55.

Figure 10A:
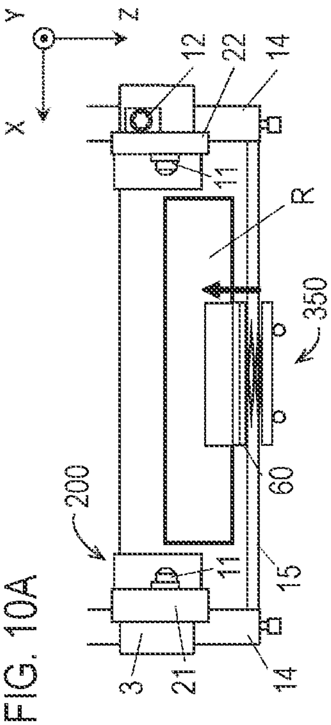
FIGS. 10A to 10D are diagrams illustrating a roll setting procedure according to the third embodiment.
Figure 10B:
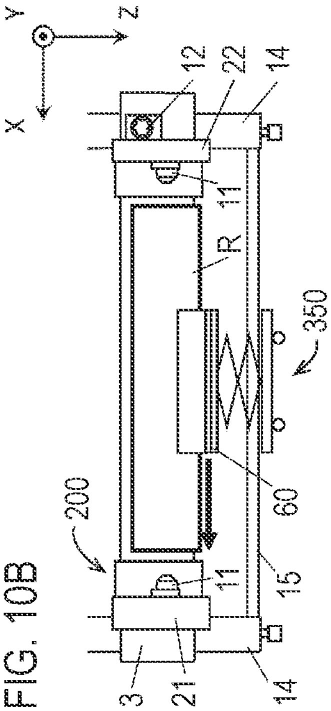
Figure 10C:
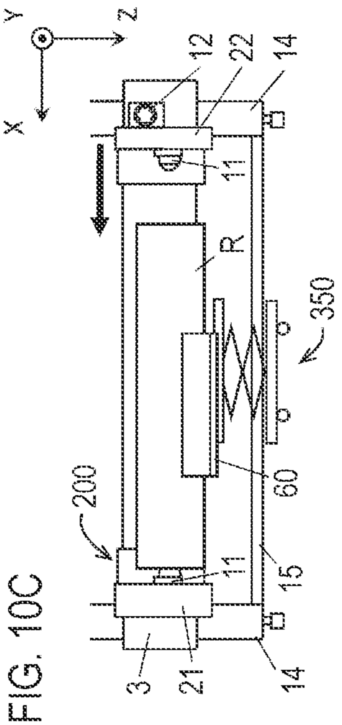
Figure 10D:
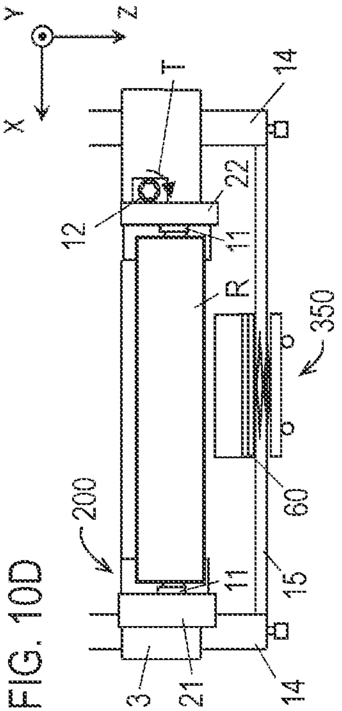

FIGS. 10A to 10D are front views illustrating a procedure of setting the roll R on the roll set portion 200 by using the cart 350 in the third embodiment. FIG. 10A illustrates a state in which the cart 350 is moved to the opposing paper-core fixing portions 11, and the roll R is positioned in the vertical direction (Z-direction). FIG. 10B illustrates a state in which the roll R positioned in the vertical direction and the receiving portion 51 are moved by the slider 60 to the reference roll holder 21 side. FIG. 10C illustrates a state in which the non-reference roll holder 22 is moved to the roll R side in a state in which the one end in the width direction of the roll R is in contact with the paper-core fixing portion 11. FIG. 10D illustrates a state in which the non-reference roll holder 22 is fixed by the lock mechanism 12, and the support of the roll R is completed.

A point that, in order to determine a position in the crossing direction (Y-direction) of the cart 350 with respect to the recording device 100, the abutting portion 54 is brought into contact with the abutting surface 15 is similar to the first embodiment. After that, as in FIG. 10A, the height of the center of the roll R is matched with the height of the paper-core fixing portion 11 in the recording device 100, and the positioning, in the vertical direction is completed. Subsequently, as in FIG. 10B, by moving the receiving portion 51 on Which the roll R is placed in the width direction by the slider 60 of the cart 350, the one end of the paper core of the roll R is inserted into the paper-core fixing portion 11 of the reference roll holder 21. In the operations so far, the center of the roll R matches the center of the paper-core fixing portion 11 at both the crossing-direction position and the vertical-direction position and thus, the paper core can be easily inserted to the paper-core fixing portion 11. A method of inserting the other end of the paper core of the roll R into the paper-core fixing portion 11 of the non-reference roll holder 22 so as to complete the setting of the roll R after that is similar to the first embodiment as shown in FIGS. 10C and 10D.

As described above, according to this embodiment, only the receiving portion 51 can be moved by the slider 60 without moving the entire cart 350 in the width direction and thus, the roll R can be moved in the width direction with a smiler three as compared with the first embodiment, That is, since the position in the width direction of the roll can be adjusted more easily by the position adjustment mechanism in a state in which the roll is positioned in the crossing direction with respect to the recording device, the workability of mounting/removal of the roll is further improved.

Fourth Embodiment

Subsequently, a fourth embodiment will be described by referring to FIGS. 11, and 12A to 12D. In the fourth embodiment, when the roll is to be set on the recording device, a method of inserting a paper core of the roll into the paper-core fixing portion is different from the first embodiment and the third embodiment. Note that a difference from the first embodiment is mainly described in the following, while the recording device 100 and other identical configurations are given the same signs, and the description thereof is omitted.

Figure 11:
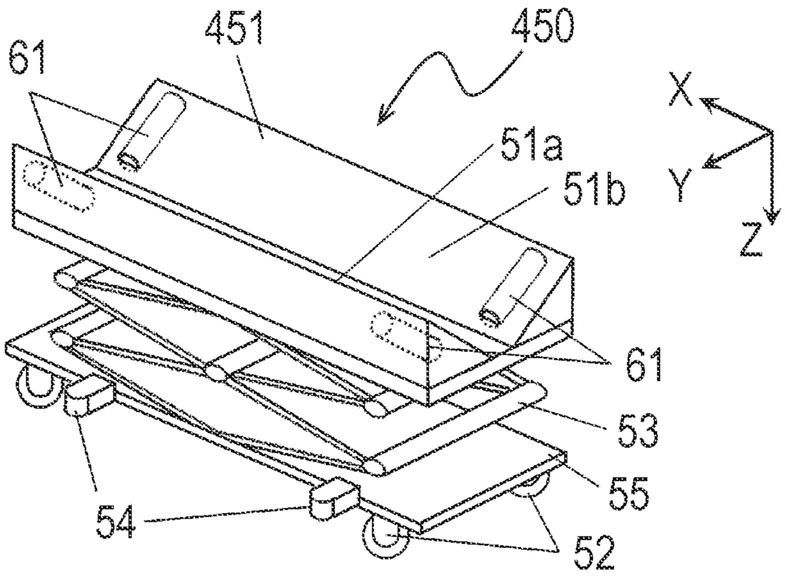
FIG. 11 is a perspective view of a cart according to a fourth embodiment.

FIG. 11 is a perspective view of a cart 450 in the fourth embodiment. As shown in FIG. 11, the cart 450 in this embodiment includes a receiving-portion roller 61 on an end part in a longitudinal direction (X-direction) of the receiving-portion inclined surfaces 51*a*, 51*b* of a receiving portion 451. The receiving-portion roller 61 as the position adjustment mechanism of the roll is rotatable in a state in which the roll R is placed thereon. By rolling of the receiving-portion roller 61 in contact with the roll R, the roll R can be moved in the width direction with a small force. The receiving-portion roller 61 extends from a vicinity of upper ends of the receiving-portion inclined surfaces 51*a*, 51*b* to a vicinity of a lower end so that it can contact the roll R compliant with winding diameters of the various rolls R.

Figure 12B:
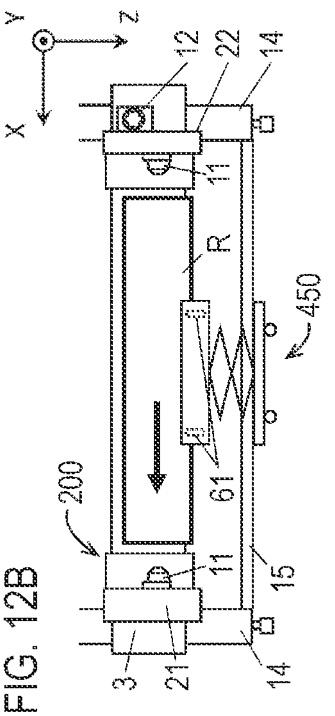
FIGS. 12A to 12D are diagrams illustrating a roll setting procedure according to the fourth embodiment.
Figure 12D:
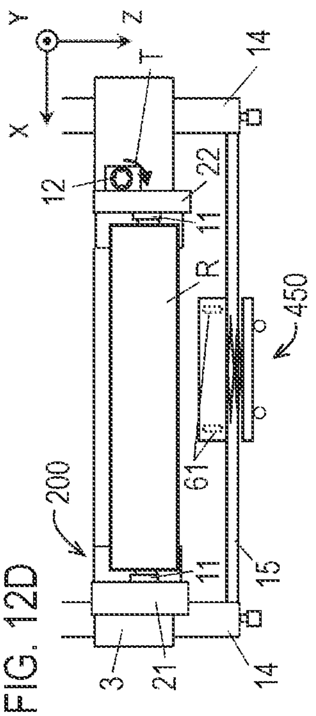
Figure 12A:
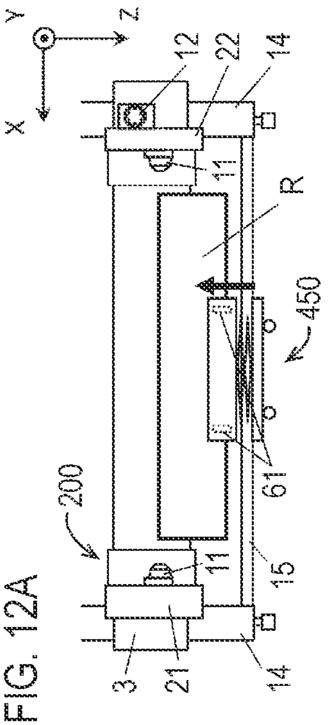
Figure 12C:
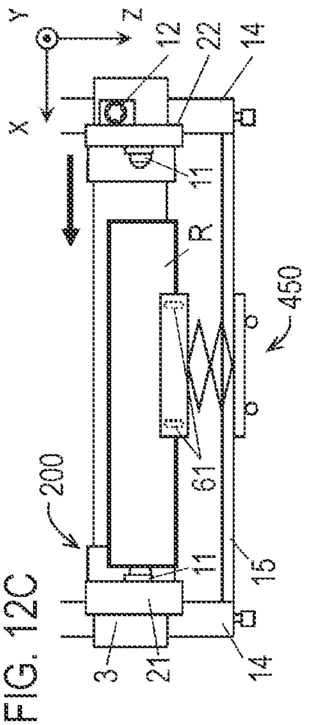

FIGS. 12A to 12D are front views illustrating a procedure of setting the roll R on the roll set portion 200 by using the cart 450 in the fourth embodiment. FIG. 12A illustrates a state in which the cart 450 is moved to a space between the opposing paper-core fixing portions 11, and the roll R is positioned in the vertical direction (Z-direction). FIG. 12B illustrates a state in which the roll R on the receiving-portion roller 61 positioned in the vertical direction is moved to the reference roll holder 21 side. FIG. 12C illustrates a state in which the non-reference roll holder 22 is moved to the roll IR side in a state in which the one end in the width direction of the roll R is in contact with the paper-core fixing portion 11. FIG. 12D illustrates a state in which the non-reference roll holder 22 is fixed by the lock mechanism 12, and the support of the roll R is completed.

A point that, in order to determine a position in the crossing direction (Y-direction) of the cart 450 with respect to the recording device 100, the abutting portion 54 is brought into contact with the abutting surface 15 is similar to the first embodiment. After that, as in FIG. 12A, the height of the center of the roll R is matched with the height of the paper-core fixing portion 11 in the recording device 100, and the positioning in the vertical direction is completed. Subsequently, as in FIG. 12B, by moving the roll R in the width direction, and the one end of the paper core of the roll IR is inserted into the paper-core fixing portion 11 of the reference roll holder 21. A method of inserting the other end of the paper core of the roll R into the paper-core fixing portion 11 of the non-reference roll holder 22 so as to complete the setting of the roll R after that is similar to the first embodiment as shown in FIGS. 12C and 12D.

As described above, according to this embodiment, only the roll R can be moved in the width direction by the receiving-portion roller 61 without moving the entire cart 450 in the width direction and thus, the roll R can be moved in the width direction with a smaller force as compared with the first embodiment. That is, since the position in the width direction of the roll can be adjusted more easily by the position adjustment mechanism in a state in which the roll is positioned in the crossing direction with respect to the recording device, the workability of mounting/removal of the roll is further improved.

Fifth Embodiment

Subsequently, a fifth embodiment will be described by referring to FIGS. 13A, 13B, and 14, The fifth embodiment is an effective configuration when a roll with a width smaller than a width in a longitudinal direction of the receiving portion of the cart is set. Note that a difference from the first embodiment is mainly described in the following, while the recording device 100 and other identical configurations are given the same signs, and the description thereof is omitted.

Figure 13B:
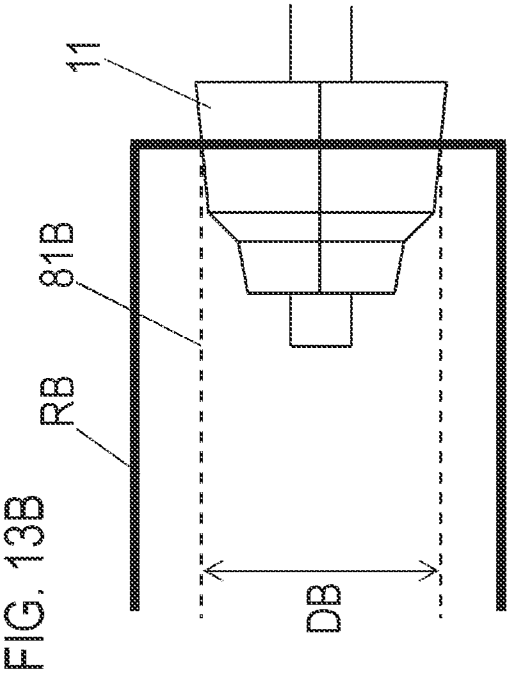
FIGS. 13A and 13B are views illustrating a state in which a paper-core fixing portion supports the roll.
Figure 13A:
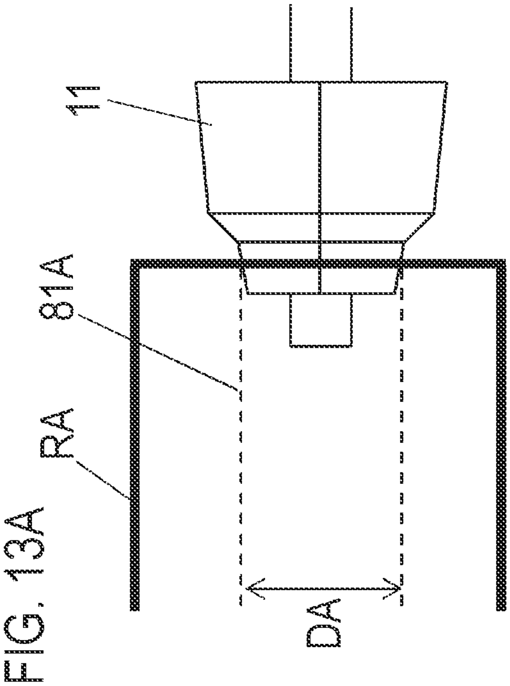

FIGS. 13A and 13B are diagrams illustrating a state in which the paper-core fixing portion 11 supports the roll R with a different paper-core diameter. FIG. 13A illustrates a state in which a roll RA including a paper core 81A with an inner diameter DA is supported, and FIG. 13B illustrates a state in which a roll RB including a paper core 81B with an inner diameter DB larger than the inner diameter DA is supported. A size of the roll R handled by the recording device 100 of the present invention is assumed to be a diameter of approximately 200 mm at the maximum, a width of 1630 mm, a weight of approximately 50 kg, and 2 inches/3 inches of a paper core size. The paper-core fixing portion 11 in this embodiment includes regions engaged with an inner diameter of the paper cores of 2 inches and 3 inches, respectively, in an outer diameter part of the paper-core fixing portion 11 which is inserted and fixed to the paper core of the roll R and supports the roll R in order to handle different paper-core sizes. When the roll R with the paper-core size of 2 inches is to be supported, the paper-core fixing portion 11 supports the roll R in the state shown in FIG. 13A, and in the case of supporting the roll R with the paper-corer size of 3 inches, in the state shown in FIG. 13B.

In order to stably support the roll R by the receiving portion 51 of the cart 50, the roll R is supported to the end part in the width direction by the receiving portion 51 so that a contact area with the roll R is increased and thus, the length of the receiving portion 51 is preferably as long as possible. However, if the roll width is small with respect to the receiving portion 51, when the roll with a paper-core size of 2 inches and a small winding diameter is to be mounted, the paper-core size of the paper-core fixing portion 11 might interfere with the receiving portion 51 by the part which supports the roll R with 3 inches. Particularly, when the roll R whose sheet has been consumed to the vicinity of the winding core and the winding diameter is reduced is to be mounted, the paper-core fixing portion 11 can easily interfere with the receiving portion 51. Then, since the roll R cannot be set appropriately by the paper-core fixing portion 11, prolongation of the length of the receiving portion 51 larger than the roll width is not preferable, either. In this embodiment, since the roll width mainly used in the market is 600 mm or more, the length in the longitudinal direction of the receiving portion 51 is 600 mm.

However, there are extremely small rolls with the roll widths less than 600 mm in the market. In the cart 50 shown in the first embodiment, for example, when the extremely small roll with the roll width of 200 mm and the paper-core size of 2 inches is to be mounted on the receiving portion 51 whose length in the longitudinal direction is 600 mm, the paper-core fixing portion 11 can interfere with the receiving portion 51. Thus, as the fifth embodiment, a configuration of the cart that can also handle the extremely small roll will be described.

Figure 14:
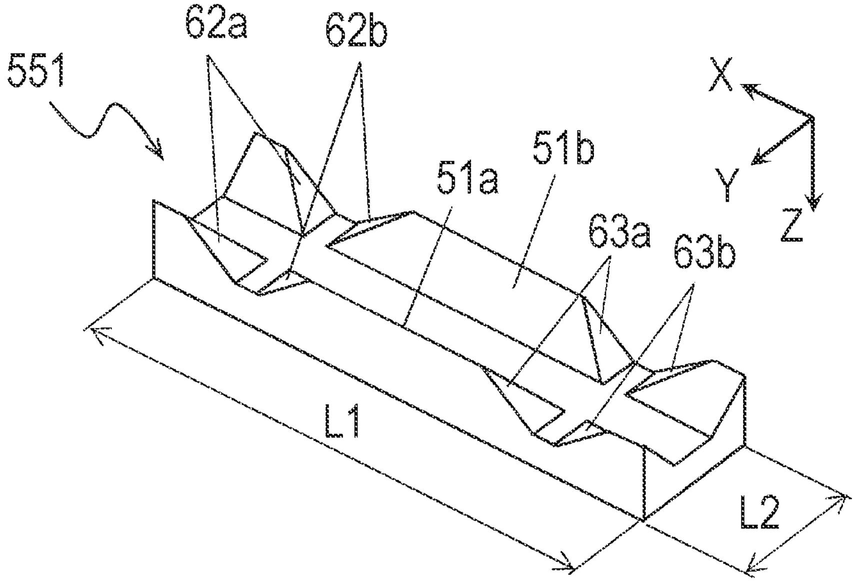
FIG. 14 is a perspective view illustrating a receiving portion of a cart according to a fifth embodiment.

FIG. 14 illustrates a receiving portion 551 of the cart according to the fifth embodiment. A length L1 in the width direction (X-direction), which is the longitudinal direction of the receiving portion 551, is 600 mm, and a length L2 in the crossing direction (Y-direction), which is a short-side direction orthogonal to the longitudinal direction, is 200 mm. The receiving portion 551 has the receiving-portion inclined surfaces 51*a*, 51*b* extending in the width direction and receiving-portion inclined surfaces 62*a*, 62*b*, 63*a*, 63*b* extending in the crossing direction. By means of these receiving-portion inclined surfaces, the receiving portion 551 includes a part looking like a V-shape when seen from the width direction and a part looking like a V-shape when seen from the crossing direction.

By means of the aforementioned configuration, when the roll width is 600 mm or more, the roll R is installed on the receiving portion 551 so that the width direction of the roll R matches a width direction of the receiving portion 551, and the roll R can be supported by the receiving-portion inclined surfaces 51*a*, 51*b*. On the other hand, when the roll width is 200 mm or more and less than 600 nm, the roll R is installed on the receiving portion 551 so that the width direction of the roll R matches the crossing direction of the receiving portion 551, and the roll R can be supported by the receiving-portion inclined surfaces 62*a*, 62*b* or the receiving-portion inclined surfaces 63*a*, 63*b*. That is, when the roll width is 200 mm or more and less than 600 mm, the direction of the cart with respect to the roll R and the recording device 100 at the roll set are rotated by 90° as compared with the case where the roll width is 600 mm or more. As described above, by installing the roll R on the cart by changing the direction of the roll R with respect to the cart depending on the roll width, the cart can support the roll R in a state in which the receiving portion of the cart is smaller than the width of the roll. Therefore, even if the extremely small roll is to be mounted on the recording device 100, the roll R can be firmly supported without interference by the receiving portion 551 with the paper-core fixing portion 11.

Moreover, in the cart of this embodiment, the positioned portion with respect to the recording device 100 such as the abutting portion and the like is provided on the end part in the width direction (longitudinal direction) and the both end parts in the crossing direction (short-side direction) of the cart. By providing the positioned portion on the end parts in the width direction and the crossing direction of the cart, respectively, even when a direction of installing the roll R on the cart is changed as described above, the cart can be positioned in the crossing direction with respect to the recording device 100.

As described above, according to this embodiment, the roll with a roll width smaller than that of the first embodiment can be set on the recording device in a state supported by the cart. Therefore, a range of the roll widths that can be handled can be further widened.

Sixth Embodiment

Subsequently, a sixth embodiment will be described by referring to FIGS. 15A and 15B. The sixth embodiment is a configuration which is effective when a roll with a width smaller than a width in the longitudinal direction of the receiving portion of the cart is set and is a mode different from the fifth embodiment. Note that a difference from the fifth embodiment is mainly described in the following, while the recording device 100 and other identical configurations are given the same signs, and the description thereof is omitted.

Figure 15B:
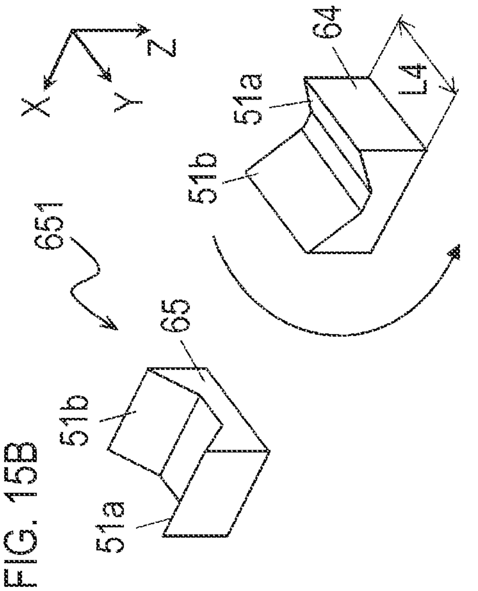
FIGS. 15A and 15B are perspective views illustrating a receiving portion of a cart according to a sixth embodiment.
Figure 15A:
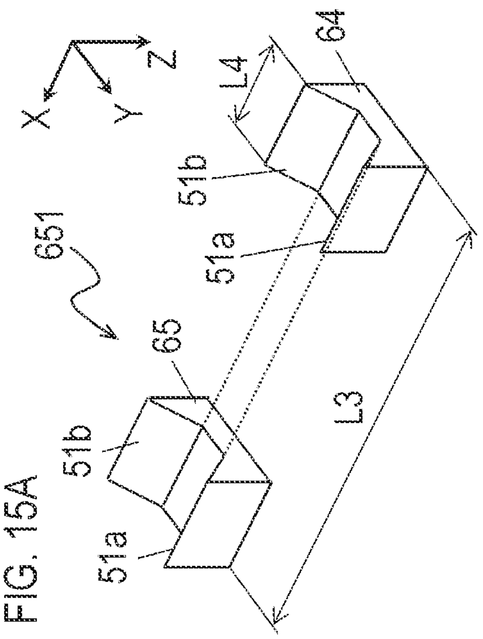

FIG. 15A illustrates a receiving portion 651 of the cart according to the sixth embodiment. The receiving portion 651 has a divided receiving portions 64, 65, which are divided into two parts in the width direction (X-direction). A length L3 in the width direction of the receiving portion 651 is 600 mm, and a length IA in the width direction of the divided receiving portion 64 is 200 nm. The divided receiving portions 64, 65 have the receiving-portion inclined surfaces 51*a*, 51*b* extending in the width direction, respectively. When the roll width is 600 nm or more, the roll R can be supported at two spots or more by placing the roll R across the divided receiving portions 64, 65 and thus, it can be firmly supported.

FIG. 15B illustrates a state in which the divided receiving portion 64 of the cart according to the sixth embodiment is rotated. The divided receiving portion 64 can be rotated by 90° around a rotation axis (not shown) extending in the vertical direction from the state in FIG. 15A. When the divided receiving portion 64 is rotated by 90°, the receiving-portion inclined surfaces 51*a*, 51*b* of the divided receiving portion 64 extending in the width direction extends in the crossing direction (Y-direction). In the case where the roll width is 200 mm or more and less than 600 mm, by installing the roll R on the divided receiving portion 64 in the state in which the divided receiving portion 64 shown in FIG. 15B is rotated, the width of the divided receiving portion 64 becomes the roll width or less. Therefore, according to the cart according to this embodiment, the roll R can be set on the recording device without interference by the paper-core fixing portion 11 with the divided receiving portion 64. Moreover, since the roll R can be set on the recording device 100 by changing the direction of the cart with respect to the recording device 100, interference by the cart with the recording device can be also prevented.

Moreover, in the cart of this embodiment, the positioned portion with respect to the recording device 100 such as the abutting portion or the like is provided on the end, part in the width direction (longitudinal direction) of the cart and the end part in the crossing direction (short-side direction) of the cart. By providing the positioned portion on the end parts in the width direction and the crossing direction of the cart, respectively, even when the direction in which the roll R is installed on the cart is changed as described above, the cart can be positioned in the crossing direction with respect to the recording device 100.

As described above, according to this embodiment, the roll with the roll width smaller than that in the first embodiment can be set on the recording device in the state of being supported by the cart. Therefore, a range of the roll widths that can be handled can be further widened.

In this embodiment, the divided receiving portion 64 is configured to be rotatable, but the divided receiving portion 65 may also be configured to be rotatable. Moreover, by setting the lengths in the longitudinal direction of the divided receiving portions 64, 65 different from each other, each of the divided receiving portions may be configured to be used separately in accordance with the roll width. At that time, the positioned portion with respect to the recording device is preferably provided on both end parts in the width direction of the cart.

Seventh Embodiment

Subsequently, a seventh embodiment will be described by referring to FIGS. 16A to 16C, 17A, and 17B. A cart 750 according to the seventh embodiment is a configuration in which an accommodation space when not in use is reduced as compared with the first embodiment. Note that a difference from the first embodiment is mainly described in the following, while the recording device 100 and other identical configurations are given the same signs, and the description thereof is omitted.

After the roll R is set on the roll set portion 200 by using the cart, the worker needs to manually operate the roll R so that the sheet can be fed from the roll R. When the roll R is operated, the receiving portion or a handle portion (not show) of the cart located in the periphery of the roll R becomes an obstacle in a state in which the cart is engaged with the recording device, which obstructs the work. Therefore, after the roll R is set on the roll set portion 200, the cart is preferably removed from the recording device 100 and moved to a remote position.

Moreover, in the recording device in which the roll holder is provided in a paper feed portion and a take-up portion, respectively, a plurality of workers perform a transport work and the like of the roll R for paper-feed and a product roll taken up after print at the same time in parallel and thus, the carts are preferably prepared in plural. When the mounting and removal of the rolls are performed at the same time in the plurality of recording devices, too, a more efficient operation is similarly enabled by preparing a plurality of the carts, in view of the circumstances described above, the seventh embodiment will be described below as a mode of a cart capable of accommodation by reducing an occupied space when a plurality of the carts are stored in one spot.

Figure 16B:
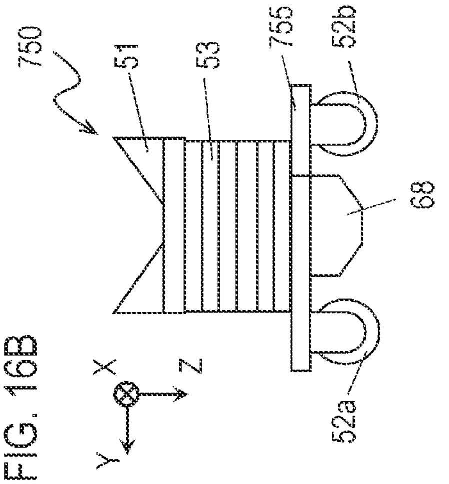
FIGS. 16A to 16C are a perspective view, a side view; and a top view of a cart according to a seventh embodiment.
Figure 16A:
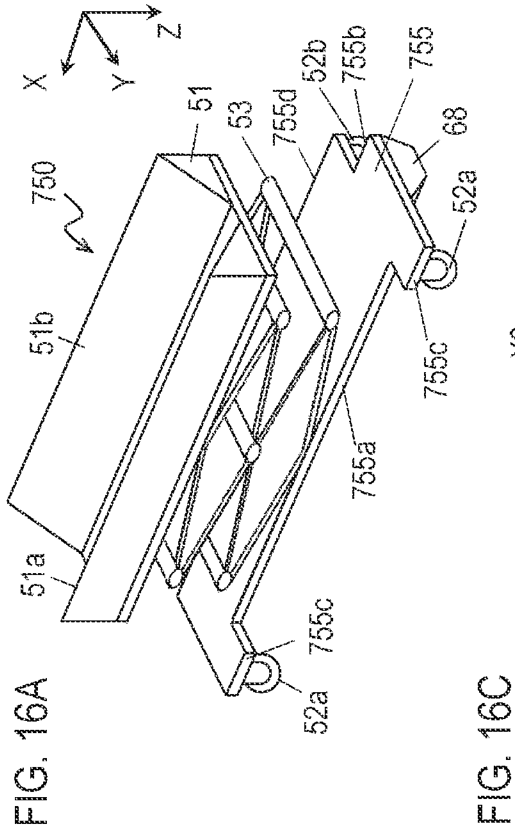

FIG. 16A is a perspective view of a cart 750 according to the seventh embodiment. By means of the cart 750, as compared with the cart 50 according to the first embodiment, a grounding area when the cart is not in use can be reduced for storage. The receiving portion 51 of the cart 750 has a configuration similar to that the first embodiment and includes the receiving-portion inclined surfaces 51*a*, 51*b* in contact with the roll R. On the other hand, the cart 750 is different from the cart 50 according to the first embodiment in a shape of a cart base portion 755 which supports the height adjustment portion 53 from below. The cart base portion 755 includes a notch 755*a* on one end in the crossing direction (Y-direction) and at the center in the width direction (X-direction). Moreover, the cart base portion 755 includes a notch 755*b* also on the other end on a side opposite to the notch 755*a* in the crossing direction and on both ends in the width direction. Furthermore, on a lower surface of the cart base portion 755, a front wheel portion 52*a*, a rear wheel portion 52*b*, and a protruding portion 68 are provided. The cart 750 is freely movable on the floor by the front wheel portion 52*a*, and the rear wheel portion 52*b*. The protruding portion 68 protrudes downward (Z-positive direction) from the cart base portion 755 and extends in the width direction (Y-direction). Moreover, at a distal end of the protruding portion 68, a taper shape made of two inclined surfaces is provided.

FIG. 16B illustrates the cart 750 when seen from the width direction (X-negative direction). A protruding amount of the protruding portion 68 is such a degree that a distal end of the protruding portion 68 does not protrude farther than a grounding part of the wheel portion, and the protruding portion 68 does not interfere with traveling of the cart 750. Moreover, the protruding portion 68 is located immediately below the receiving portion 51. The reason why such a positional relationship was taken will be described later.

A width in the crossing direction of the receiving portion 51 is such a degree that is approximately the same as the winding diameter of the roll R when a sheet residual amount is small so that the roll R can be unloaded easily even when the winding diameter of the roll R is small. On the other hand, when the cart 750 is seen from the width direction, the front wheel portion 52*a* and the rear wheel portion 52*b* are located on an outer side of the receiving portion 51. In this embodiment, an interval in the crossing direction between the wheel portions 52 is approximately the same as the winding diameter of the roll R When the residual amount of the roll R is large, and they are in such a positional relationship with respect to the receiving portion 51 that the wheel portions 52 protrude to both sides in the crossing direction, respectively. By means of such disposition, even the roll R with a large sheet residual amount and a large winding diameter can be stably transported by the cart 750.

Figure 16C:
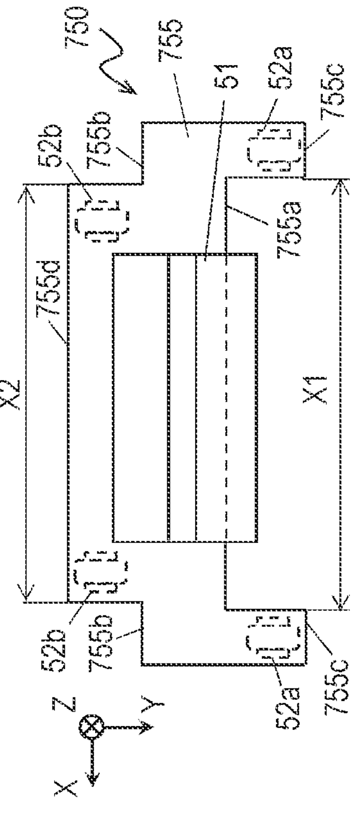

FIG. 16C illustrates the cart 750 when seen from above (Z-negative direction). A length in the width direction of the receiving portion 51 corresponds to various roll widths and thus, it is determined by considering a roll with the smallest roll width in the rolls R assumed to be supported. By setting the length in the width direction of the receiving portion 51 smaller than the smallest roll width, operability in mounting/removing of the roll R is not impaired by the receiving portion 51. On the other hand, when the cart 750 is seen from the vertical direction (Z-direction), the front wheel portion 52*a* and the rear wheel portion 52*b* are located on the outer side of the receiving portion 51 in the width direction. In this embodiment, the interval in the width direction between each of the front wheel portion 52*a* and the rear wheel portion 52*b* is approximately the same as the largest roll width in the roll widths assumed to be supported, and they are in such a positional relationship that the wheel portion 52 protrudes on both sides in the width direction with respect to the receiving portion 51. By means of such disposition, even the roll R with a large width can be stably transported by the cart 750.

As described above, in the cart base portion 755, a notch 755*a* is provided on one end side in the crossing direction and a notch 755*b* on the other end side. The notch 755*a* is located at a center part in the width direction of the cart base portion 755, and on both end parts in the width direction of the cart base portion 755, a protruding portion 755*c* protruding on the one end side in the crossing direction is formed. The notch 755*b* is located on both ends in the width direction of the cart base portion 755, and a protruding portion 755*d* protruding to the other end side in the crossing direction is formed at the center part in the width direction of the cart base portion 755. A length X1 in the width direction of the notch 755*a* on the one end side is larger with respect to a length X2 in the width direction of the protruding portion 755*d* on the other end side, and a relationship of X1>X2 is satisfied. Moreover, when seen from the crossing direction, the notch 755*a* and the protruding portion 755*d* overlap each other, and the notch 755*b* and the protruding portion 755*c* overlap each other. The protruding portion 755*c* and the protruding portion 755*d* may have a function as the positioned portions in contact with the positioning portion of the recording device 100.

The front wheel portion 52*a* is provided on the protruding portion 755*c* on the one end side in the crossing direction of the cart base portion 755, and the rear wheel portion 52*b* is provided on the protruding portion 755*d* on the other end side in the crossing direction of the cart base portion 755. That is, the front wheel portion 52*a* and the rear wheel portion 52*b* are provided at shifted positions in the crossing direction.

Subsequently, an accommodation-space reduction effect when a plurality of the carts 750 are accommodated will be described. FIG. 17A illustrates a state in which a plurality of the carts 750 stacked vertically are seen from the width direction (X-negative direction). When the cart 750 is to be accommodated, as shown in FIG. 17A, a second cart 750B can be stacked on a first cart 750A. At this time, a tapered surface of the receiving portion 51 provided on the upper part of the first cart 750A is engaged with the tapered surface of the protruding portion 68 provided on the lower part of the second cart 750B. By configuring as above, the first cart 750A can stably support the second cart 750B. Moreover, another cart can be also stacked on the second cart 750B. By having the configuration that the carts can be stably stacked vertically as above, a grounding area for two units or more of the carts can be an area for one unit of the cart and thus, an occupied space when the cart is not in use can be reduced.

Figure 17B:
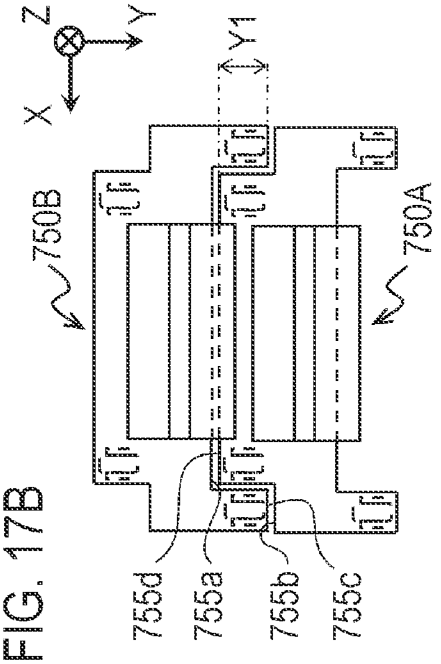
FIGS. 17A and 17B are a side view and a top view illustrating an accommodated form of a cart according to the seventh embodiment.
Figure 17A:
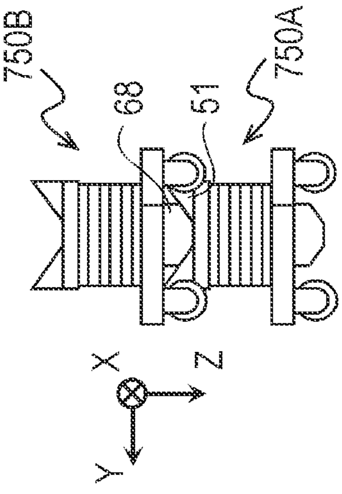

FIG. 17B illustrates a state in which a plurality of the carts 750 accommodated in line in the crossing direction (Y-direction are seen from above (Z-negative direction). As described above, the cart base portion 755 has the notch 755*a* and the protruding portion 755*c* on the one end side in the crossing direction and the notch 755*b* and the protruding portion 755*d* on the other end side. When the first cart 750A and the second cart 750B are accommodated by being aligned in the crossing direction, they can be disposed such that the protruding portion 755*d* of the first cart 750A is fitted in the notch 755*a* of the second cart 750B. At this time, they are disposed such that the protruding portion 755*c* of the second cart 750B is fitted in the notch 755*b* of the first cart 750A. As described above, by disposing the first cart 750A and the second cart 750B so that the cart base portions 755 of each of them overlap each other when seen from the width direction, the accommodation space can be reduced for a portion of a length Y1 in the crossing direction of the overlapping part. Moreover, since the cart base portion 755 of the first cart 750A is fitted in the notch 755*a* of the cart base portion 755 of the second cart 750B, the first cart 750A and the second cart 750B can be transported stably at the same time in the fitted state.

By configuring such that the notch portions and the protruding portions of the plurality of carts are fitted as above, the accommodation space when the cart is not in use can be reduced as compared with the first embodiment. Therefore, according to this embodiment, more carts can be prepared easily and thus, the workability of mounting/removing of the roll is improved.

Eighth Embodiment

Subsequently, an eighth embodiment will be described by referring to FIGS. 18A and 18B. The eighth embodiment is a configuration in which the accommodation space when the cart is not in use is reduced and is a mode different from the seventh embodiment. Note that a difference from the seventh embodiment is mainly described in the following, while the recording device 100 and other identical configurations are given the same signs, and the description thereof is omitted.

Figure 18A:
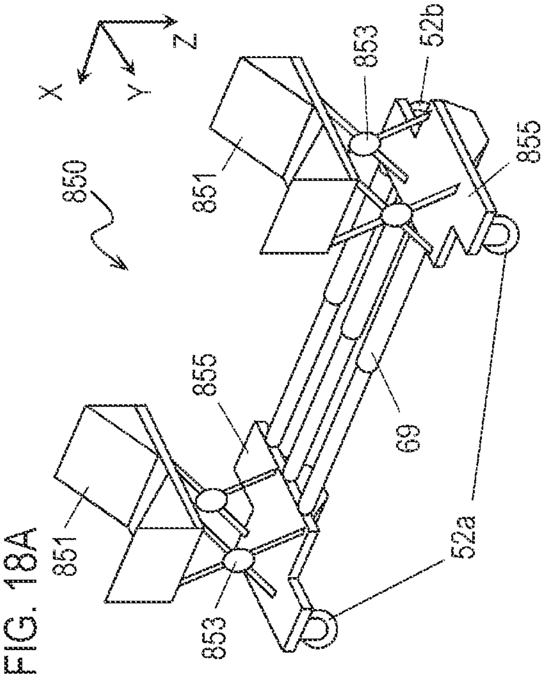
FIGS. 18A and 18B are perspective views of a cart according to an eighth embodiment.
Figure 18B:
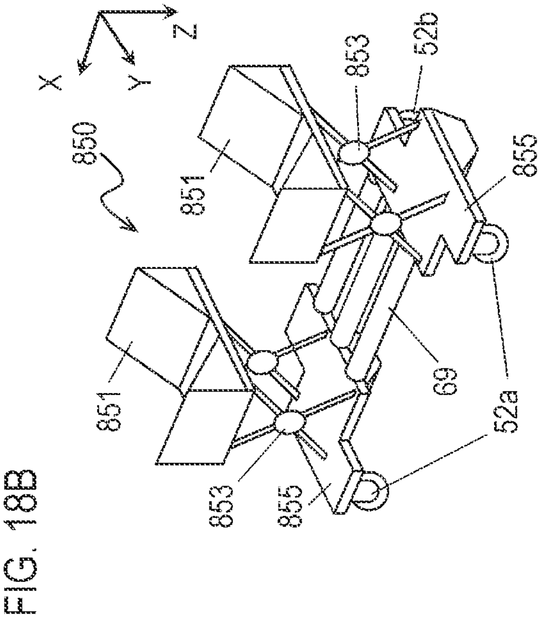

FIG. 18A is a perspective view of a state in which an extension/contraction mechanism 69 of a cart 850 according to an eighth embodiment is fully extended. FIG. 18B is a perspective view of a state in which the extension/contraction mechanism 69 of the cart 850 is contracted. By means of the cart 850, as compared with the cart 750 according to the seventh embodiment, the carts can be accommodated with a further reduced grounding area when the cart is not in use. In the cart 850, a receiving portion 851 and a cart base portion 855 are divided in the width direction (X-direction). On the divided cart base portions 855, on each of which a protruding portion and a notch portion are formed, the receiving portion 851 and a height adjustment portion 853 are provided. Moreover, between the divided cart base portions 855, the extension/contraction mechanism 69 capable of extension contraction is provided. That is, the cart 850 is configured such that a length in the width direction is changeable by extension/contraction of the extension contraction mechanism 69.

By configuring as above, as compared with the seventh embodiment, the accommodation space can be further reduced when the cart is not in use. Moreover, the cart in this embodiment has a configuration capable of handling a wider range of the roll widths as compared with the first embodiment and the seventh embodiment, since the width-direction length is changeable. Therefore, according to this embodiment, in addition to the reduction of the accommodation space when the cart is not in use, the range of the roll widths that can be handled can be widened.

Note that application of the present invention is not limited to the aforementioned embodiments. For example, the configuration of each embodiment may be freely combined such that the receiving-portion roller 61 illustrated in the fourth embodiment is provided in the receiving portion 551 illustrated in the fifth embodiment.

Examples of the configurations or concepts disclosed in the aforementioned embodiments are shown below. However, these are only exemplifications, and the aforementioned disclosures of the embodiments are not limited to the configurations or concepts shown below.

Configuration A1

A recording device in which a roll around which a sheet is wound is attached in a state supported by a cart, and an image is recorded on the sheet supplied from the roll, comprising:

a roll support portion which supports the roll on an end part in a width direction of the roll; and a guide portion which extends in the width direction and supports the roll support portion movably in the width direction, wherein in a state in which the cart makes the roll movable in the width direction, a positioning portion which determines a position in a crossing direction crossing the width direction of a positioned portion provided in the cart with respect to the roll support portion is further included.

Configuration A2

The recording device described in the configuration A1, wherein the positioning portion is a surface which is orthogonal to the crossing direction, extends in the width direction and is in contact with the positioned portion.

Configuration A3

The recording device described in the configuration A1, wherein the positioning portion is a rail which extends in the width direction and is engaged with the positioned portion.

Configuration A4

A cart which supports a roll when the roll around which a sheet is wound is attached to a recording device, comprising:

a roll receiving portion which supports the roll from below;

a positioned portion whose position in a crossing direction crossing a width direction of the roll with respect to the recording device is determined by a positioning portion provided in the recording device; and a position adjustment mechanism capable of adjusting a position in the width direction of the roll supported by the roll receiving portion in a state in which the positioned portion is positioned by the positioning portion.

Configuration A5

The cart described in the configuration A4, wherein the recording device further includes a height adjustment portion capable of adjusting a height of the roll receiving portion.

Configuration A6

The cart described in the configuration A4 or A5, wherein the positioned portion includes an abutting portion in contact with the positioning portion in the crossing direction.

Configuration A7

The cart described in the configuration A4 or A5, wherein the positioned portion is a lever mechanism capable of changing by swinging to a first attitude of being engaged with the positioned portion and a second attitude in which the engagement with the positioned portion is disengaged.

Configuration A8

The cart described in any one of the configuration A4 to A7, wherein the roll receiving portion includes two inclined surfaces forming a V-shape when viewed from the width direction; and the positioned portion is provided on an end part in the crossing direction of the cart.

Configuration A9

The cart described in any one of the configuration A4 to A8, wherein the roll receiving portion includes two inclined surfaces forming a V-shape when viewed from the crossing direction; and the positioned portion is further provided on an end part in the width direction of the cart.

Configuration A10

The cart described in the configuration A9, wherein two inclined surfaces forming a V-shape when viewed from the crossing direction are formed on end parts in the width direction of the roll receiving portion.

Configuration A11

The cart described in any one of the configuration A4 to A8, wherein the roll receiving portion is formed by being divided in the width direction;

in the divided roll receiving portion, at least one is rotatable around a rotation axis extending in a vertical direction; and the positioned portion is provided on an end part in the crossing direction and on an end part in the width direction of the cart.

Configuration A12

The cart described in any one of the configuration A4 to A11, wherein the cart further includes a cart base portion which supports the roll receiving portion; and the position adjustment mechanism is a wheel portion provided on a lower part of the cart base portion.

Configuration A13

The cart described in the configuration A12, wherein the roll receiving portion includes a roller in contact with the roll and rotatable in the width direction.

Configuration A14

The cart described in any one of the configuration A4 to A11, wherein the cart further includes a cart base portion which supports the roll receiving portion; and the position adjustment mechanism is a slide mechanism capable of adjusting a position in the width direction of the roll receiving portion with respect to the cart base portion.

Configuration A15

The cart described in any one of the configuration A12 to A14, wherein the cart includes a protruding portion which protrudes downward from the cart base portion and has two inclined surfaces forming a V-shape at a distal end; and the protruding portion overlaps the roll receiving portion when viewed from a vertical direction.

Configuration A16

The cart described in any one of the configurations A12 to A15, wherein the cart base portion has a protruding portion which protrudes to one end side in the crossing direction and a notch portion formed on the other end side opposite to the one end side in the crossing direction, the protruding portion and the notch portion overlap each other when seen from the crossing direction, and in the width direction, a length of the notch portion is longer than a length of the protruding portion.

Configuration A17

The cart described in any one of the configurations A12 to A16, wherein the cart base portion is formed by being divided in the width direction, and the cart further includes an extension/contraction mechanism provided between the divided cart base portions and capable of extension/contraction in the width direction.

Configuration A18

A roll attachment mechanism which attaches a roll supported by a cart to a recording device which records an image on a sheet supplied from the roll around which the sheet is wound, wherein the recording device includes a roll support portion which supports the roll around which the sheet is wound on an end part in a width direction of the roll, a guide portion which extends in the width direction and movably supports the roll support portion in the width direction, and a positioning portion which determines a position of the cart with respect to the recording device in a crossing direction which extends in the width direction and crosses the width direction, and the cart includes a roll receiving portion which supports the roll from below, a positioned portion engaged with the positioning portion, and a position adjustment mechanism capable of adjusting a position in the width direction of the roll supported by the roll receiving portion in a state in which the positioning portion is engaged with the positioned portion.

When the roll is to be conveyed to the sheet supply device prior to the setting of the roll, since it is difficult to carry a roll particularly with a high weight directly by hands, the roll is placed on the cart capable of supporting the roll from below for conveyance in many cases. At this time, if the roll can be set on the holder while it is still on the cart, there is no need to unload the roll from the cart even once from conveyance to the setting of the roll and workability of the roll attachment is improved. Thus, the sheet supply device and the recording device which can improve workability of the roll attachment to the sheet supply device will be described.

Ninth Embodiment

Recording Device

Frist, a basic configuration of a recording device 1100 including the sheet supply device according to a ninth embodiment of the present invention will be described by referring to FIGS. 19 and 20. As the recording device, an inkjet recording device including a sheet supply device which supplies a sheet as a print medium and a recording portion which performs a recording operation such as print of an image on the sheet will be described as an application example. Moreover, a term "ink" in this description is used as a collective name of liquids such as recording liquids. Furthermore, when the same figure of various devices and the like which will be described below has the same or corresponding members in plural, suffixes such as a, b and the like are given and indicated in the figure but if there is no need to discriminate them in the explanation, the suffixes such as a, h and the like are omitted in the description.

Figure 19:
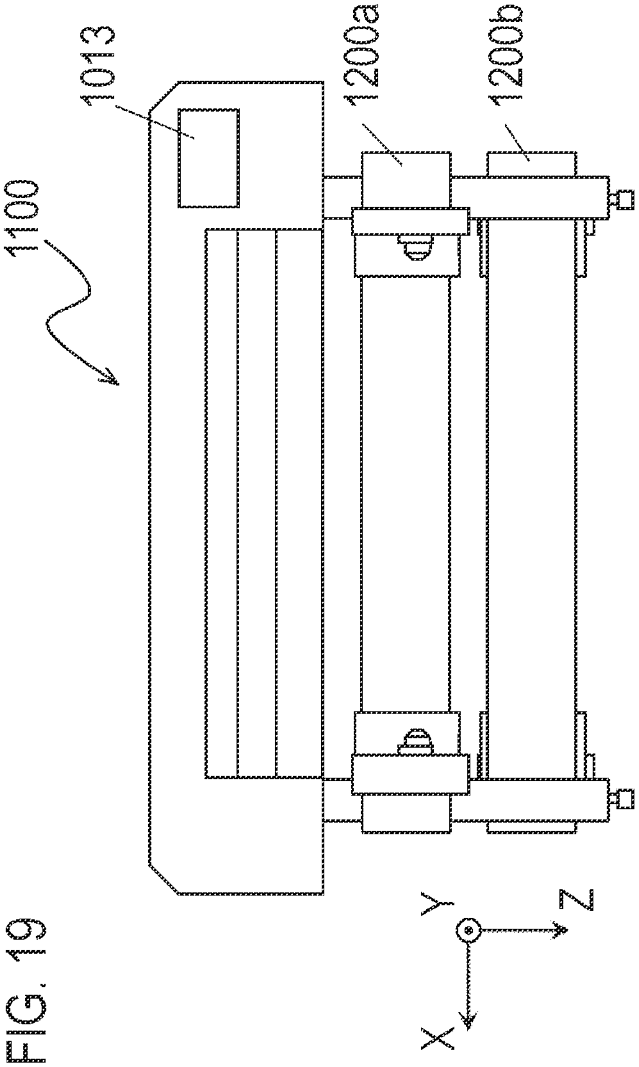
FIG. 19 is a front view of the recording device.

FIG. 19 is a front view of the recording device 1100. The recording device 1100 includes a roll set portion 1200 which can send out the roll around which a sheet is wound in a roll state while supporting it as the sheet supply device. In the recording device 1100, a roll set portion 1200*a* on the paper-feed side and a roll set portion 1200*b* on the take-up side are provided. An image can be printed on the sheet supplied from the roll supported by the roll set portion 1200*a*, and the roll set portion 1200*b* can take up the printed sheet. A user can input various commands and the like such as specification of a size of the roll, setting of a type of the roll and the like to the recording device 1100 by using the various switches provided on an operation panel 1013. Note that, as shown in FIG. 19, a width direction of the roll supported by the recording device 1100 is defined as an X-axis direction, a depth direction of the device as a Y-axis direction, and a gravity direction as a Z-axis direction, respectively, in the following explanation. In this embodiment, the X-axis direction, the Y-axis direction, and the Z-axis direction are orthogonal to one another.

Figure 20:
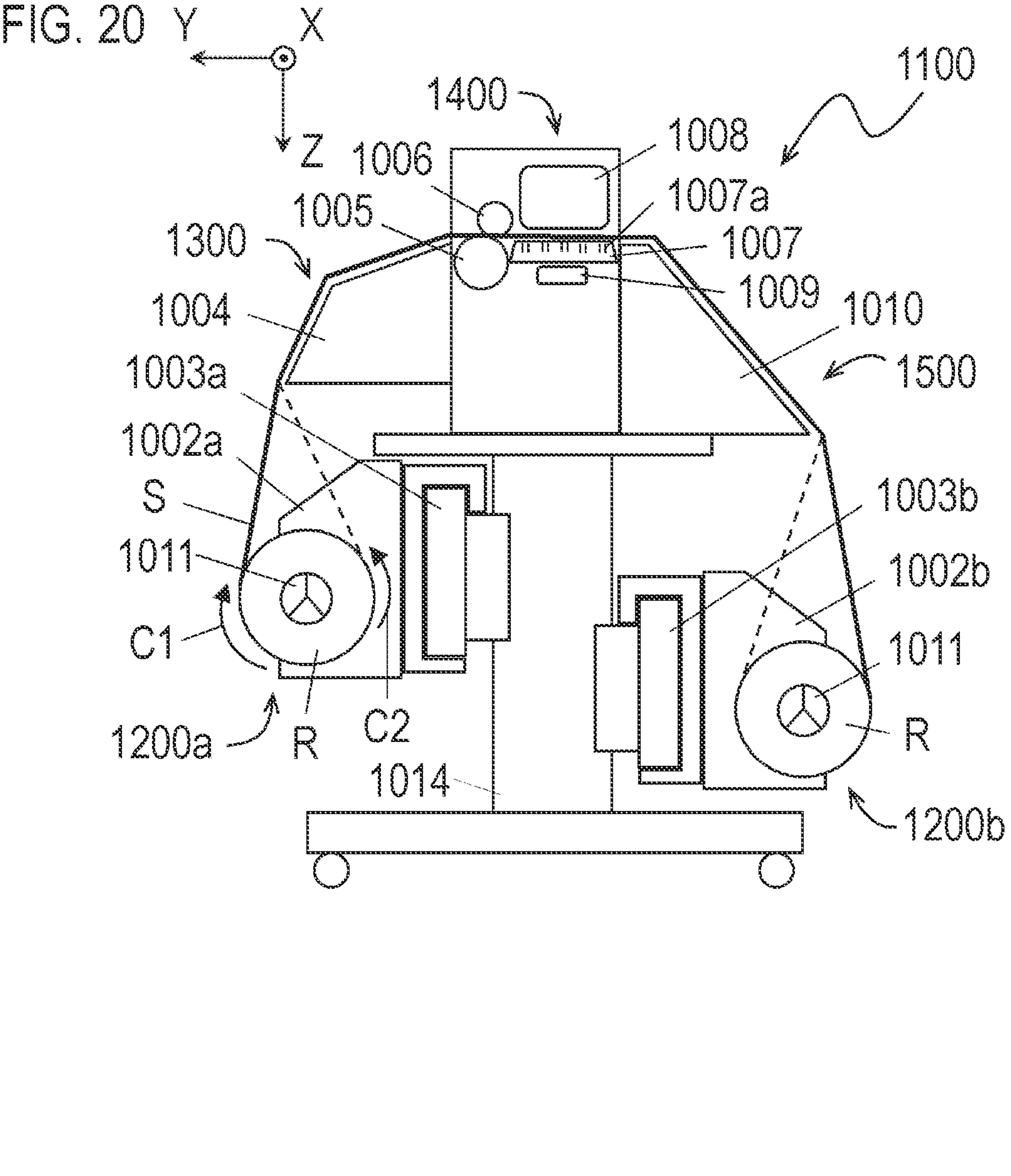
FIG. 20 is a schematic sectional view of the recording device illustrating a conveyance path of a sheet.

FIG. 20 is a schematic sectional view of the recording device 1100 illustrating a conveyance path of the sheet S. The sheet S pulled out of the roll R set on (attached to) the roll set portion 1200*a* is connected to the roll set portion 1200*b* and is taken up. The roll set portion 1200 includes a roll holder 1002 and a holder guide 1003. The roll set portion 1200, the roll holder 1002, and the holder guide 1003 provided on the paper-feed side and the take-up side, respectively, will be described by discriminating them as necessary by giving "a" to the end of a sign of a member on the paper-feed side and "b" to the end of a sign of a member on the take-up side.

The sheet S pulled out of the roll R and set on the roll set portion 1200*a* is conveyed by an upstream sheet conveying portion 1300 to a print portion 1400 as a recording portion capable of printing an image. In the print portion 1400, the image is printed on the sheet S by ejection of the ink from an inkjet-type printhead 1008.

The printhead 1008 ejects the ink from an ejection port by using an ejection energy-generating element such as an electricity-heat conversion element (heater), a piezo element and the like. When the electricity-heat conversion element is used, the ink is foamed by heat generation thereof, and the ink can be ejected from the ejection port by using the foaming energy. In an application of the present invention, the printhead 1008 is not limited only to an inkjet type. Moreover, a print type of the print portion 1400 is not limited, either, and it may be a serial scan type, a full-line type and the like, for example. In the case of the serial scan type, the image is printed with a conveying operation of the sheet S and scanning of the printhead 1008 in a direction crossing the conveying direction of the sheet S. In the case of the full-line type, the printhead 1008 which is lengthy and extends in the direction crossing the conveying direction of the sheet S is used, and an image is printed while the sheet S is continuously conveyed.

In a hollow hole portion of the roll R, a shaft-shaped paper-core fixing portion 1011 provided on the roll holder 1002 is inserted. The paper-core fixing portion 1011 is rotated forward and reversely and driven by transmission of power from a roll drive motor, not shown, provided on the roll holder 1002. The roll is held at a center part by the paper-core fixing portion 1011 and is rotated in arrow C1, C2 directions. By enabling driving in both directions of forward rotation and reverse rotation, print can be performed selectively on a front surface or a back surface of the sheet S as shown by a path indicated by a solid line and a dotted line continuing from the roll set portion 1200*a* on the paper-feed side in FIG. 20 to the upstream sheet conveying portion 1300. Similarly, the printed surface of the sheet S can be selectively taken up on an outer side or an inner side as shown by a path indicated by a solid line and a dotted line continuing from a downstream sheet conveying portion 1500 in FIG. 20, which will be described later, to the roll set portion 1200*b* on the take-up side.

An upstream conveyance guide 1004 of the upstream sheet conveying portion 1300 leads the sheet S to the print portion 1400 while guiding the front surface and the back surface of the sheet S pulled out of the roll set portion 1200*a*. A conveyance roller 1005 is rotated forward and reversely by a conveyance-roller drive motor. A nip roller 1006 is capable of being driven/rotated in accordance with rotation of the conveyance roller 1005. A conveying speed of the sheet S by the conveyance roller 1005 is set higher than a pulling-out speed of the sheet S by the rotation of the roll R, whereby a back tension is given to the sheet S so that the sheet S can be conveyed in a state in which a tension is applied to the sheet S. As a result, sagging of the sheet S is prevented, and occurrence of a crease in the sheet S and occurrence of a conveyance error can be suppressed.

A platen 1007 in the print portion 1400 adsorbs a back surface on a side opposite to a recording surface of the sheet S through a suction hole 1007*a* provided in the platen 1007 by a negative pressure generated by a suction fan 1009. As a result, by regulating the position of the sheet S so that it goes on the platen 1007, high-precision print of an image by the printhead 1008 can be made possible.

A downstream conveyance guide 1010 of the downstream sheet conveying portion 1500 leads the sheet S to the roll set portion 1200*b* on the take-up side while guiding the front surface and the back surface of the sheet S pulled out of the print portion 1400. Here, a distal end of the sheet S is fixed to a paper core which was set on the roll set portion 1200*b*, and by rotating the paper core set in accordance with the conveying speed of the conveyance roller 1005, the sheet S printed by the print portion 1400 can be continuously taken up.

The recording device 1100 includes a stand 1014 on both end parts in the width direction, respectively. The stand 1014 supports weights of the upstream sheet conveying portion 1300, the print portion 1400, and the downstream sheet conveying portion 1500 on an upper part of a main body from below and supports the weight of the roll R through the roll set portion 1200. The stand 1014 is connected to the holder guide 1003 of the roll set portion 1200 and also functions as a guide support portion which supports the holder guide 1003. The stand 1014 is in contact with a floor surface and releases the weight of the recording device 1100 to the floor surface.

Roll Set Portion

Figures 21A, 21B, 21C:
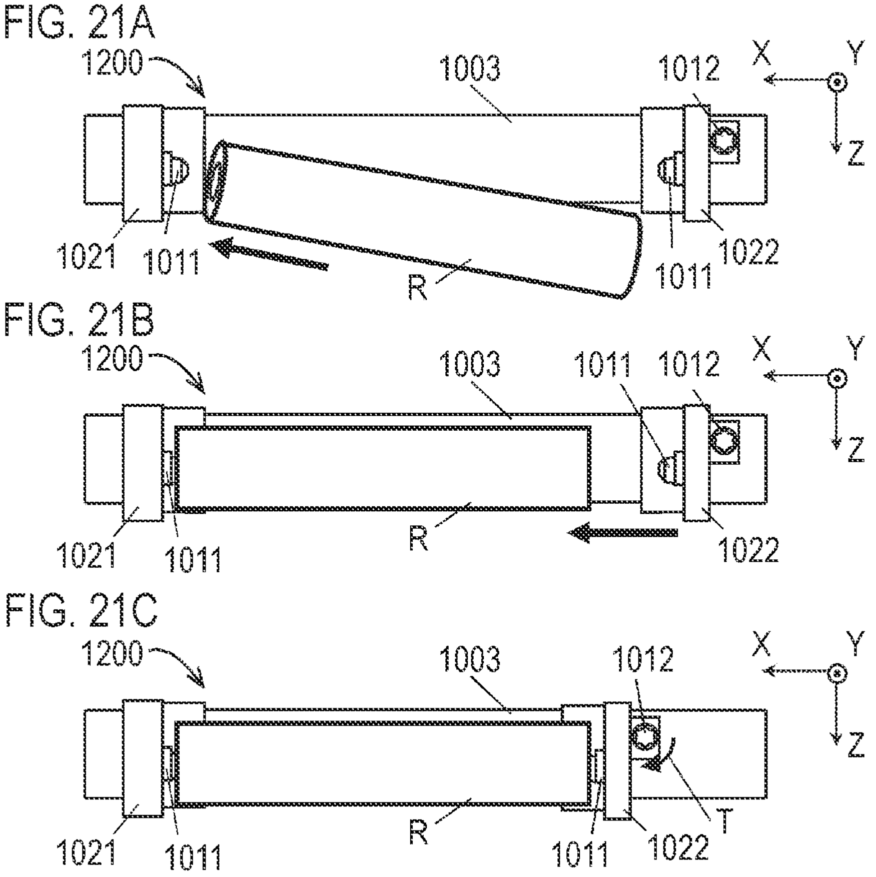
FIGS. 21A to 21C are diagrams illustrating a state in which the roll is set on a roll holder.

Subsequently, by referring to FIGS. 21A to 21C, and 22, details of the roll set portion 1200 according to this embodiment will be described. FIGS. 21A to 21C are explanatory diagrams illustrating a state in which the roll R is set on the roll set portion 1200. FIG. 21A illustrates a state in which the paper-core fixing portion 1011 of a reference roll holder 1021 is inserted into one end in the width direction of the roll R. FIG. 21B illustrates a state in which the paper-core fixing portion 1011 of a non-reference roll holder 1022 is inserted into the other end of the roll R whose one end is supported. FIG. 21C illustrates a state in which the non-reference roll holder 1022 is fixed by a lock mechanism 1012, and support of the roll R is completed.

The roll holder 1002 provided on the roll set portion 1200 is constituted by a reference roll holder 1021 and a non-reference roll holder 1022 which make a pair. The reference roll holder 1021 supports the one end side in the width direction of the roll R, while the non-reference roll holder 1022 supports the other end side in the width direction of the roll R so that the roll R is supported by the roll holder 1002. The paper-core fixing portion 1011 is rotatably mounted on each of the reference roll holder 1021 and the non-reference roll holder 1022. The non-reference roll holder 1022 is held by the holder guide 1003 as the guide portion slidably in the width direction (X-direction) of the roll R. Moreover, the lock mechanism 1012 is provided on the non-reference roll holder 1022, and by turning a knob provided on the lock mechanism 1012 in a T direction, the non-reference roll holder 1022 can be fixed at an arbitrary position in the width direction with respect to the holder guide 1003. The reference roll holder 1021 is also held by the holder guide 1003, but the slide mechanism is not indispensable. A friction member is provided in the paper-core fixing portion 1011, and when the roll R is set, the roll R and the paper-core fixing portion 1011 are rotated integrally. In the reference roll holder 1021, a roll drive motor, not shown, is provided in connection to the paper-core fixing portion 1011. By transmission of a rotary force by the roll drive motor to the paper-core fixing portion 1011, the paper-core fixing portion 1011 on the reference side is rotated forward and reversely and driven. The paper-core fixing portion 1011 on the non-reference side does not have the drive motor connected and is driven and rotated by the drive transmitted through the paper core of the roll R, when the roll R is set.

When the roll R is to be set on the roll set portion 1200, first, as shown in FIG. 21A the paper-core fixing portion 1011 of the reference roll holder 1021 is inserted into one of the paper cores of the roll R. When the one of the paper cores of the roll R is brought into contact with the paper-core fixing portion 1011, the friction member of the paper-core fixing portion 1011 is fitted in the paper core of the roll R. As a result, the roll R is fixed to the paper-core fixing portion 1011 of the reference roll holder 1021. Subsequently, as shown in FIG. 21B, the non-reference roll holder 1022 is slid in the width direction, and the paper-core fixing portion 1011 of the non-reference roll holder 1022 is inserted into the other paper core of the roll R. As a result, similarly to the reference side, the roll R is fixed to the paper-core fixing portion 1011 of the non-reference roll holder 1022. Lastly, as shown in FIG. 21C, the non-reference roll holder 1022 is fixed to the holder guide 1003 by using the lock mechanism 1012. As a result, sliding of the non-reference roll holder 1022 in the paper width direction, which causes removal of the roll R, is prevented.

By holding the roll R by using the slide mechanism by the roll holder 1002 and the holder guide 1003, the roll R is firmly supported by the roll set portion 1200 regardless of the roll width. That is, the roll set portion 1200 is configured to be capable of setting the roll R with an arbitrary width not larger than a length in the width direction of the holder guide 1003. Moreover, in the case of a configuration in which the reference roll holder 1021 is fixed to the holder guide 1003 and is not slid, since the end part of the roll R is fitted in the fixed reference roll holder 1021, the reference-side end part position of the roll R is configured to be determined constant with respect to the roll set portion 1200.

The setting of the roll R to the roll set portion 1200 shown in FIGS. 21A to 21C has been described above, and by performing this setting procedure in a reverse order, the roll R can be removed from the roll set portion 1200.

Figure 22:
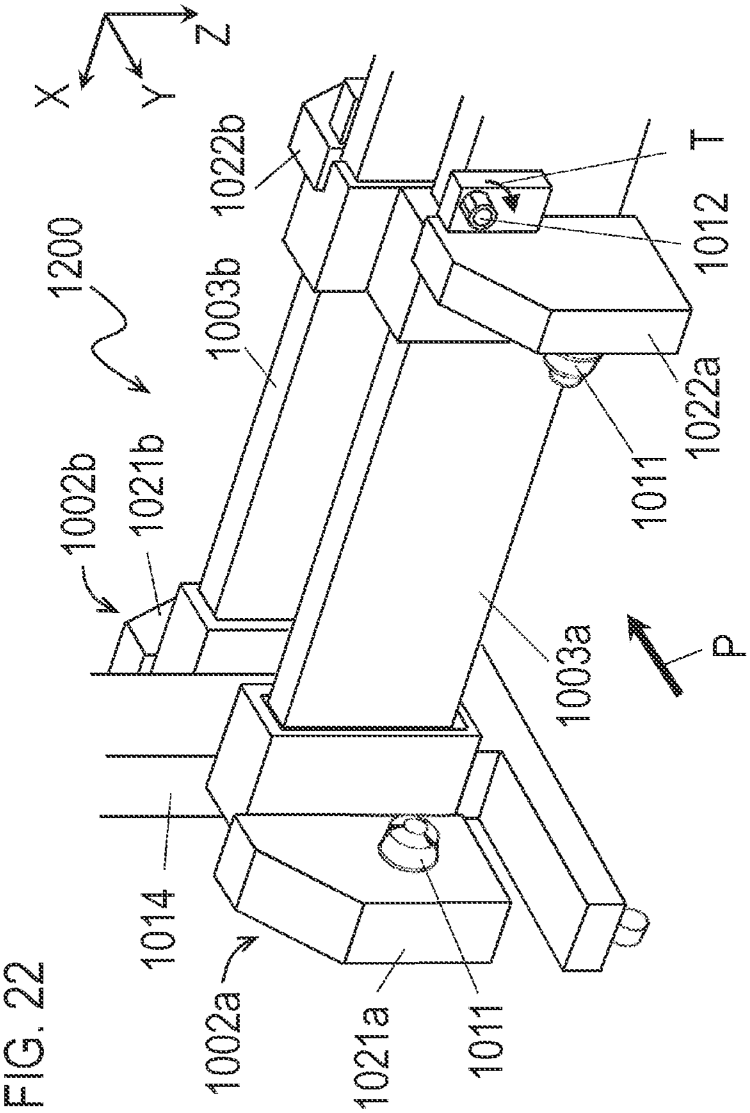
FIG. 22 is a perspective view of a roll set portion according to a ninth embodiment.

FIG. 22 is a perspective view of the roll set portion 1200 according to the ninth embodiment. To the stand 1014, a holder guide 1003*a* on the paper-feed side and a holder guide 1003*b* on the take-up side are fixed. The roll holder 1002*a* on the paper-feed side is configured such that a reference roll holder 1021*a* (first roll support portion) and a non-reference roll holder 1022*a* (second roll support portion) are disposed on a front side of the recording device (Y-positive direction side) with respect to the holder guide 1003*a*. That is, the holder guide 1003*a* is disposed on a main-body depth side (Y-negative direction side) with respect to the paper-core fixing portion 1011 on the paper-feed side. By having such configuration, since there is no structure such as the holder guide 1003 or the like on a main-body front side or a main-body lower side of the paper-core fixing portion 1011, the roll holder 1002*a* on the paper-teed side does not make an obstacle in the mounting work of the roll R. Therefore, in the recording device 1100, movement in an entry direction P shown in FIG. 22 with the roll R placed on the cart and setting with the roll R still on the cart are made possible. In this embodiment, the entry direction P is parallel to the depth direction (Y-direction), and an upstream side in the entry direction P is the device front side, and a downstream side is a device depth side.

Moreover, the roll holder 1002*b* on the take-up side is configured such that a reference roll holder 1021*b* (third roll support portion) and a non-reference roll holder 1022*b* (fourth roll support portion) are disposed on the main-body depth side with respect to the holder guide 1003*b*. That is, in the recording device 1100, four roll support portions are provided. Regarding the roll holder 1002*b* on the take-up side, since there is no structure such as the holder guide 1003 or the like on the main-body depth side or the main-body lower side of the paper-core fixing portion 1011, workability of the removal of the roll R is favorable.

Cart

Figure 23:
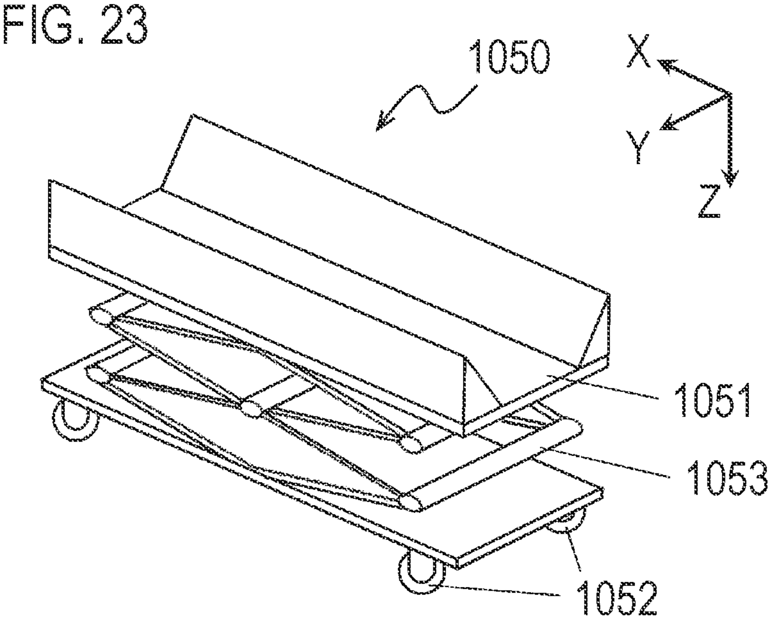
FIG. 23 is a perspective view of a cart according to the ninth embodiment.

FIG. 23 is a perspective view of a cart 1050 according to the ninth embodiment. The cart 1050 includes a receiving portion 1051 which can support the roll R from below in a state in which the width direction of the roll R is horizontal, a wheel portion 1052 for movement, and a height adjustment portion 1053 which can adjust a height position of the receiving portion 1051. A length in the width direction (X-direction) of the receiving portion 1051 is configured to be smaller than the roll width of the roll R to be set so that the roll holder 1002 does not interfere with the receiving portion 1051 at the roll setting. Moreover, on the receiving portion 1051, an inclined surface in order to prevent rolling and falling of the roll R is provided. There is no particular limitation on a detailed form of the cart 1050, but it is preferable that the height of the receiving portion 1051 can be adjusted by the height adjustment portion 1053 or the like so that various roll diameters can be handled.

Figure 24A:
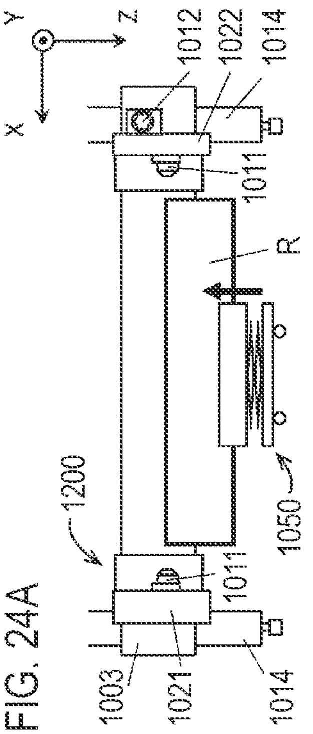
FIGS. 24A to 24D are diagrams illustrating a roll setting procedure according to the ninth embodiment.
Figure 24B:
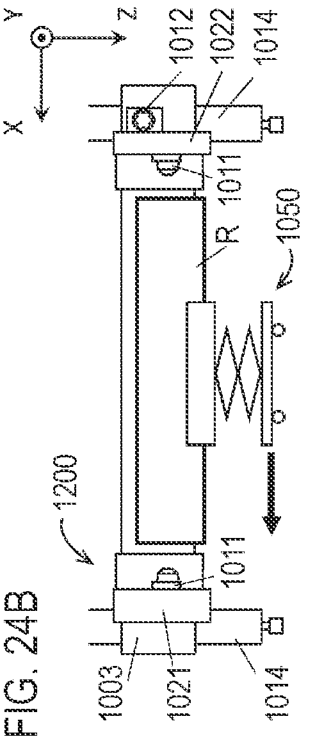
Figure 24C:
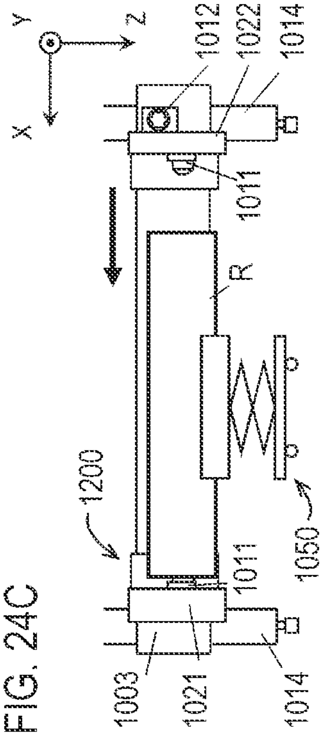
Figure 24D:
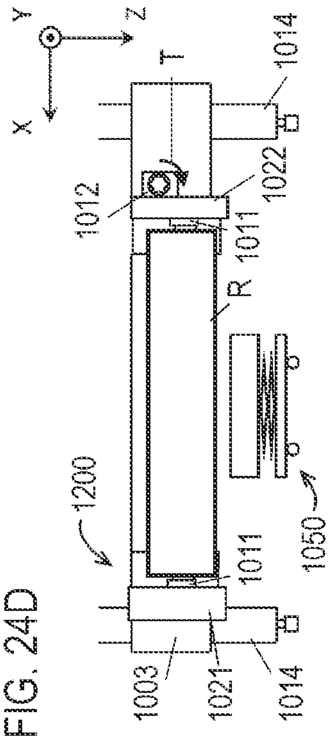

FIGS. 24A to 24D are front views illustrating a procedure of setting the roll R on the roll set portion 1200 by using the cart 1050. FIG. 24A illustrates a state in which, after the cart 1050 is moved to a space between the opposing paper-core fixing portions 1011, the roll R is positioned in the vertical direction. FIG. 241B illustrates a state in which the cart 1050 on which the roll R is placed is moved to the reference roll holder 1021 side. FIG. 24C illustrates a state in which the non-reference roll holder 1022 is moved to the roll R side in a state in which the one end in the width direction of the roll R is in contact with the paper-core fixing portion 1011. FIG. 24D illustrates a state in which the non-reference roll holder 1022 is fixed by the lock mechanism 1012, and the support of the roll R is completed.

When the roll R placed on the receiving portion 1051 of the cart 1050 is to be set on the roll set portion 1200, first, the cart 1050 is moved so that the roll R is positioned in a region sandwiched by the two roll holders 1002. After the position of the roll R in the depth direction (Y-direction) is determined, as in FIG. 24A, the height of the center of the roll R is matched with the height of the paper-core fixing portion 1011 of the recording device 1100, and the positioning in the vertical direction is performed. The height adjustment portion 1053 is provided on the cart 1050, and the height (Z-direction position) of the roll R is adjusted by using it. Subsequently, as in FIG. 24B, by moving the cart 1050 in the width direction, the one end of the paper core of the roll R is inserted into the paper-core fixing portion 1011 of the reference roll holder 1021. Since both of a depth-direction position and a vertical-direction position of the center of the roll R match each other with respect to the paper-core fixing portion 1011 by the operations so far, the paper core can be easily inserted into the paper-core fixing portion 1011. When the one end of the paper core of the roll R and the paper-core fixing portion 1011 contact each other, the friction member of the paper-core fixing portion 1011 is fitted in the paper core of the roll R. As a result, the roll R is fixed to the paper-core fixing portion 1011 of the reference roll holder 1021. Moreover, as in FIG. 24C, the non-reference roll holder 1022 is slid in the width direction so as to get closer to the roll R, and the other end of the paper core of the roll R is inserted into the paper-core fixing portion 1011 of the non-reference roll holder 1022. As a result, similarly to the reference roll holder 1021, the roll R is fixed to the paper-core fixing portion 1011 of the non-reference roll holder 1022, and the width-direction (X-direction) position of the roll R is determined. Lastly, as in FIG. 24D, the non-reference roll holder 1022 is fixed to the holder guide 1003 by using the lock mechanism 1012. As a result, sliding of the non-reference roll holder 1022 in the width direction and removal of the roll R from the roll holder 1002 are prevented. Subsequently, the receiving portion 1051 is lowered downward by the height adjustment portion 1053, and the cart 1050 is retreated from the roll R so that the setting of the roll R on the recording device 1100 is completed.

The setting procedure of the roll R on the roll set portion 1200 by using the cart 1050 has been described in FIGS. 24A to 24D so far, and by performing this setting procedure in a reverse order, the roll R can be removed from the roll set portion 1200 without manually supporting the roll R. By configuring such that the cart 1050 can be used for the removal of the roll R, operations from the removal of the roll R from the recording device 1100 to the conveyance of the roll R can be performed without unloading the roll R from the cart 1050. Moreover, by setting the roll, which has one side printed and was removed from the roll set portion 1200*b* on the take-up side by using the cart 1050, on the roll set portion 1200*a* on the paper-feed side while the roll remains on the cart 1050, double-sided printing can be performed without unloading the roll R from the cart 1050.

Figure 25B:
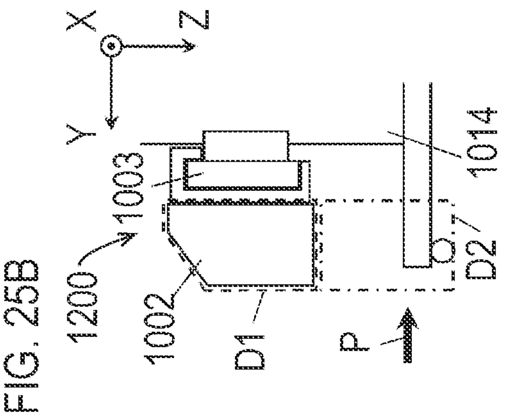
FIGS. 25A and 25B are diagrams illustrating a space formed in the recording device according to the ninth embodiment.
Figure 25A:
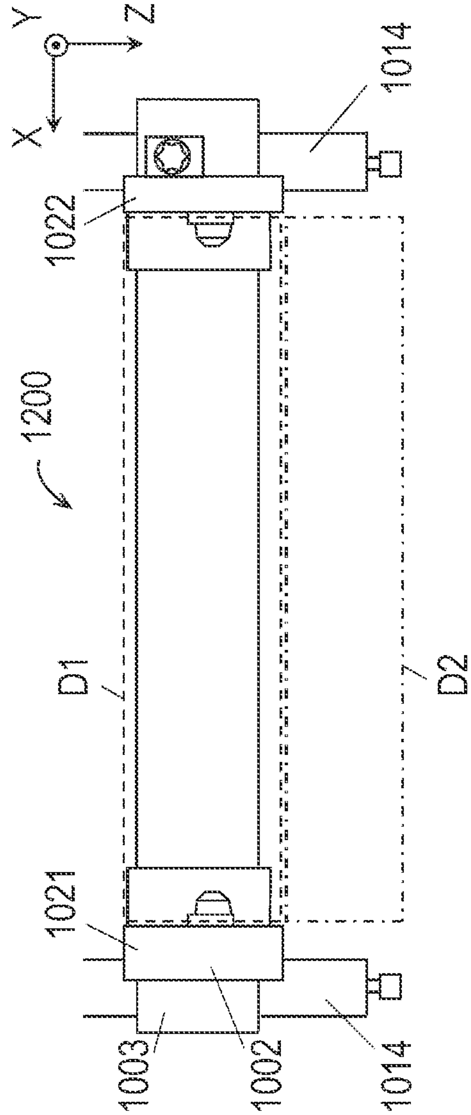

FIGS. 25A and 25B are diagrams illustrating a space in Which the roll R is set or a space into which the cart 1050 is made to enter in the recording device 1100. In a space between the reference roll holder 1021 and the non-reference roll holder 1022 of the roll holder 1002 oppose each other, a first space D1 in which the roll R is installed is formed. Below the first space D1, there is no obstacle when the cart 1050 is to be disposed, and a second space D2 into which the cart 1050 enters at the roll set is formed. The cart 1050 on which the roll R is placed moves from the device front side to the device depth side and enters the second space D2. Note that each of the spaces described above does not mean that there is no object at all but it is only necessary that obstacles or the like are not present to such a degree that the respective objects can be achieved.

As described above, according to this embodiment, since the roll R can be set with the roll R placed on the cart 1050, the operations from the conveyance of the roll R to the setting thereof on the roll set portion 1200 can be performed without unloading the roll R from the cart 1050. Moreover, when the roll is to be set, since the weight of the roll R is supported by the cart 1050 at all times, the roll R can be set without manually supporting the weight of the roll R. That is, the workability of the roll attachment to the roll holder 1002 of the roll set portion 1200 is improved.

Tenth Embodiment

Subsequently, a tenth embodiment will be described by referring to FIG. 26. In the tenth embodiment, the positional relationship between the roll set portion 1200*a* on the paper-teed side and the roll set portion 1200*b* on the take-up side is different from that of the ninth embodiment, Note that a difference from the ninth embodiment is mainly described in the following, while the other identical configurations are given the same signs, and the description thereof is omitted.

Figure 26:
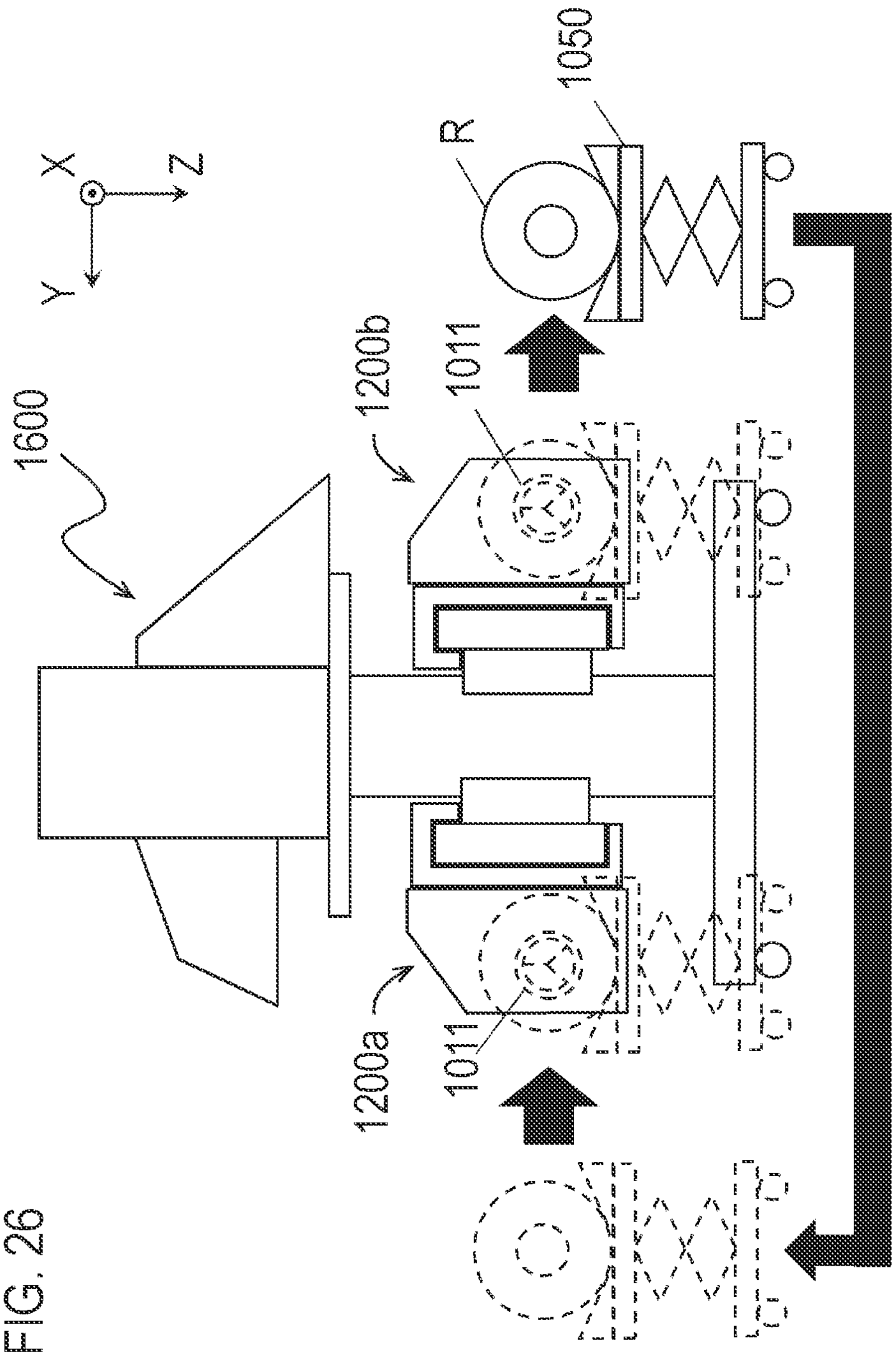
FIG. 26 is a side view of the recording device illustrating a movement path of a cart according to a tenth embodiment.

FIG. 26 is a side view of a recording device 1600 according to the tenth embodiment. In FIG. 26, an operation from removal to resetting of the roll R by using the cart 1050 is illustrated. Such operation is performed when the roll R in which one side has been printed in double-sided printing is switched from the roll set portion 1200*b* to the roll set portion 1200*a*. In the tenth embodiment, the roll set portion 1200*a*, the roll set portion 1200*b*, and the paper-core fixing portions 1011 provided on each of them are configured with the same height. That is, the rotation center of the roll supported by the roll set portion 1200*a* and the rotation center of the roll supported by the roll set portion 1200*b* match each other in height.

In the case of the double-sided print, after the print is performed on one side of the sheet, the taken-up roll needs to be set on the roll set portion on the paper-feed side again. At this time, in this embodiment, the roll R is removed from the roll set portion 1200*b* on the take-up side and is placed on the cart 1050, the cart 1050 with the roll R placed thereon is moved to the roll set portion 1200*a* on the paper-feed side, and the roll R can be set on the roll set portion 1200*a*. That is, after the one-side print, without manually lifting up the roll R and without adjusting the height of the cart 1050, the work from the removal to the mounting of the roll R can be performed. If the heights of the paper-core fixing portions 1011 of the roll set portion 1200*a* and the roll set portion 1200*b* are different, when the roll R is to be re-set on the roll set portion 1200*a*, the height of the cart 1050 needs to be adjusted or the roll R needs to be lifted up temporarily. Thus, by setting the heights of the paper-core fixing portions 1011 of the roll set portion 1200*a* and the roll set portion 1200*b* the same as in this embodiment, the series of works of the removal, conveyance, and re-setting of the roll R can be performed without adjusting the height of the roll R and thus, the workability is improved.

Eleventh Embodiment

Subsequently, an eleventh embodiment will be described by referring to FIGS. 27A and 27B. In the eleventh embodiment, a sliding configuration of the non-reference roll holder 1022 is different from that of the ninth embodiment. Note that a difference from the ninth embodiment is mainly described in the following, while the other identical configurations are given the same signs, and the description thereof is omitted.

Figure 27A:
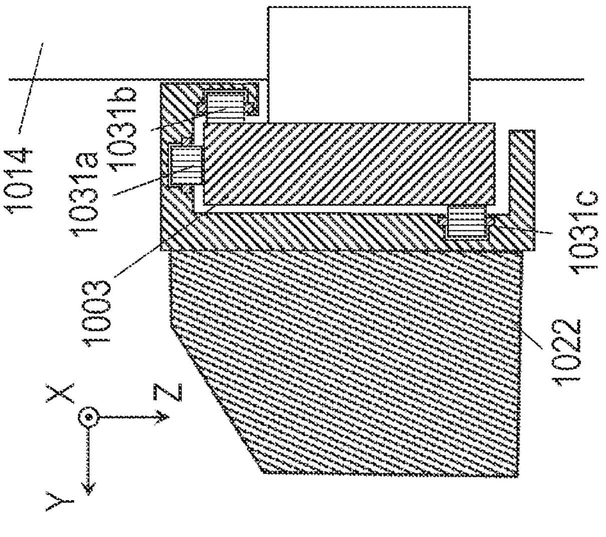
FIGS. 27A and 27B are sectional views of a non-reference roll holder according to an eleventh of embodiment.

FIG. 27A is a sectional view illustrating a slide mechanism of the non-reference roll holder 1022. The non-reference roll holder 1022 on which the paper-core fixing portion 1011 is provided is capable f sliding in the width direction (X-direction) along the holder guide 1003. The non-reference roll holder 1022 in this embodiment has a plurality of holder rollers 1031 as roller portions in contact with the holder guide 1003. The non-reference roll holder 1022 is supported by the holder guide 1003 through the holder rollers 1031. The holder rollers 1031 are fixed rotatably around a rotation axis extending in a direction orthogonal to the width direction with respect to the non-reference roll holder 1022. By means of rotation of the holder rollers 1031 connected to the non-reference roll holder 1022 and in contact with the holder guide 1003, sliding resistance of the non-reference roll holder 1022 at the sliding is reduced.

In the non-reference roll holder 1022, a holder roller 1031*a* (first roller), a holder roller 1031*b* (second roller), and a holder roller 1031*c* (third roller) are provided. The holder roller 1031*a* is brought into contact with the holder guide 1003 downward (Z-positive direction) from the upper side in the vertical direction. The holder roller 1031*b* is brought into contact with an upper end part of the holder guide 1003 by being directed to the front (Y-positive direction) from a depth side in the depth direction. The holder roller 1031*c* is brought into contact with a lower end part of the holder guide 1003 below the holder roller 1031*b* by being directed to the depth (Y-negative direction) from the front side in the depth direction. Moreover, the holder roller 1031*a*, the holder roller 10311), the holder roller 1031*c* are provided in plural rows in the width direction. By disposing the holder rollers 1031 as above, the non-reference roll holder 1022 is supported not to be inclined with respect to a moment generated by the weight of the non-reference roll holder 1022 located closer to the main-body front side than the holder guide 1003. Moreover, by disposing one row or more of the holder rollers 1031 in each of an outer side and an inner side with respect to the contact part between the paper-core fixing portion 1011 and the paper core in the width direction, the non-reference roll holder 1022 can slide in the width direction without nibbling the holder guide 1003.

Figure 27B:
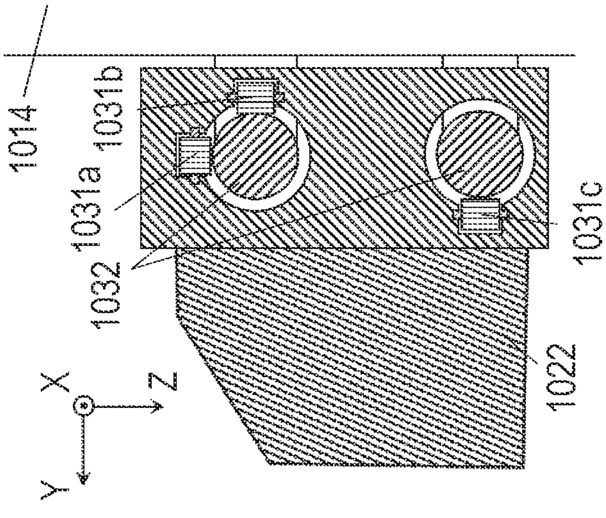

FIG. 27B is a sectional view illustrating the slide mechanism of the non-reference roll holder 1022 of an example different from the example shown in FIG. 27A in the eleventh embodiment. In the example shown in FIG. 27A, a sectional shape of the holder guide 1003 is a rectangle, but in the example shown in FIG. 27B, two pieces of holder guides 1032 having a circular sectional shape are provided by being aligned in the vertical direction. In this configuration, too, by configuring a contact direction and a contact position of the holder roller 1031 with respect to the holder guide 1032 similarly to the configuration described above, the sliding resistance at the sliding can be reduced while the non-reference roll holder 1022 is slidably supported in an appropriate attitude.

Note that the shapes of the roll holder and the holder guide, the number and disposition configuration of the holder rollers are not limited to the configuration described above but are capable of various changes. For example, the number of holder rollers may be increased for further stabler support of the roll holders.

Twelfth Embodiment

Subsequently, a twelfth embodiment will be described by referring to FIGS. 28, 29, 30A, and 30B. The twelfth embodiment is different from the ninth embodiment in a point that a position adjustment mechanism that adjusts the position of the roll holder 1002 for alignment adjustment is provided. Note that a difference from the ninth embodiment is mainly described in the following, while the other identical configurations are given the same signs, and the description thereof is omitted.

Figure 28:
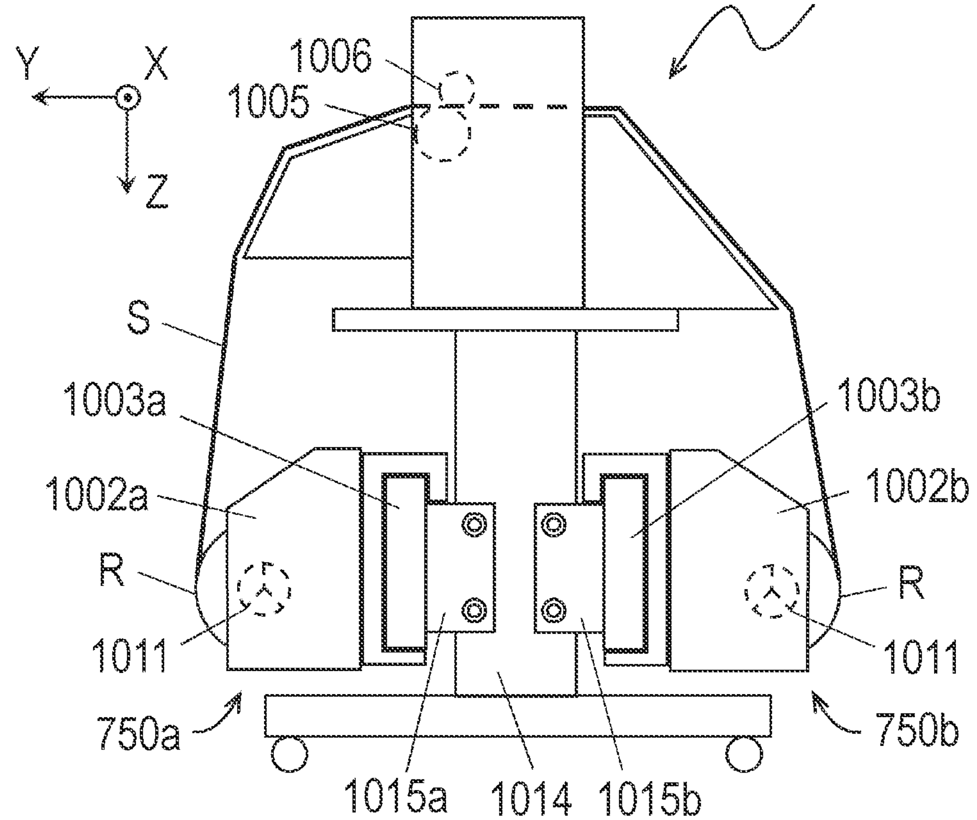
FIG. 28 is a schematic side view of a recording device according to a twelfth embodiment.
Figure 29:
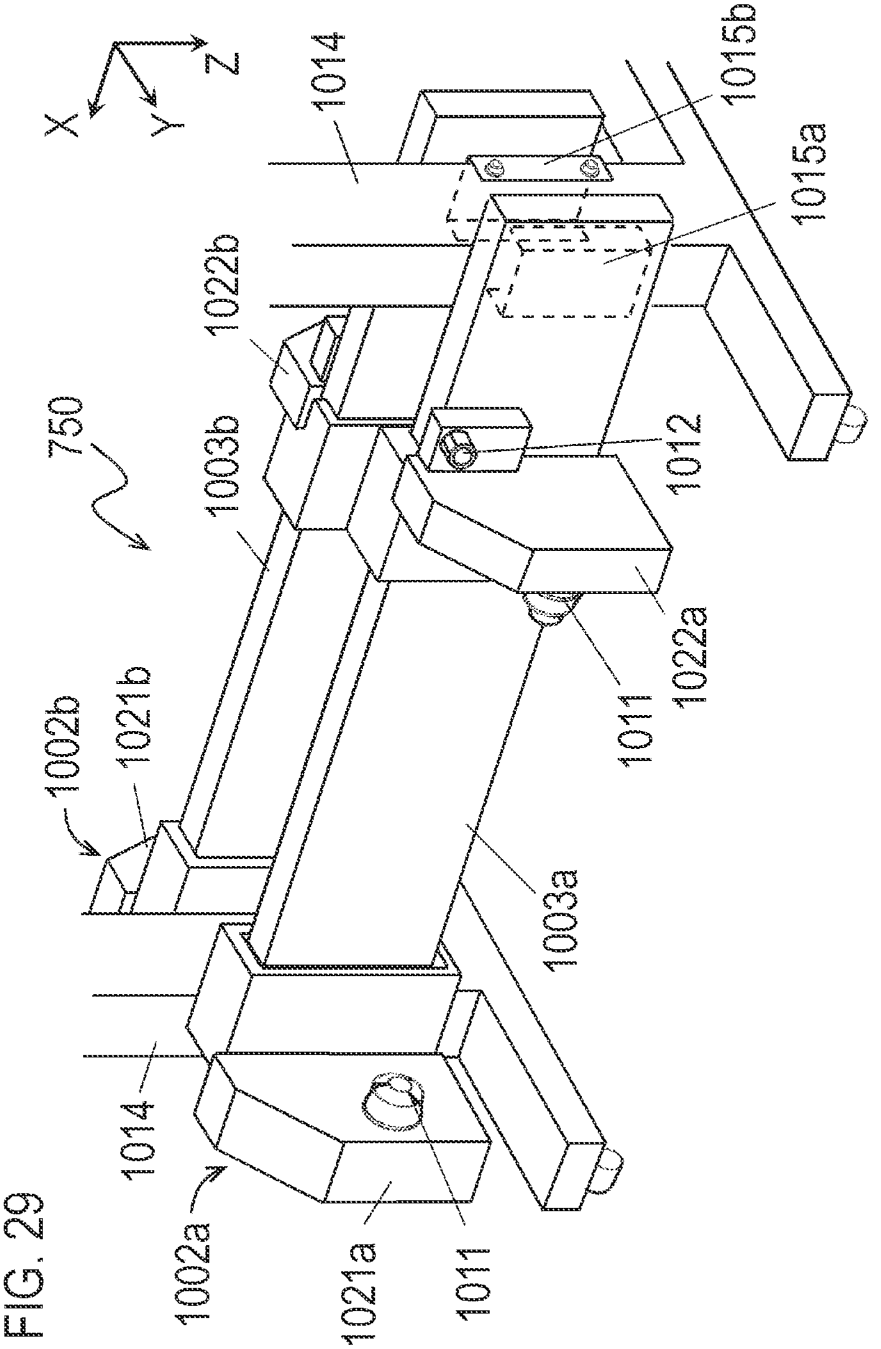
FIG. 29 is a perspective view of a periphery of a roll holder according to the twelfth embodiment.

FIG. 28 is a side view of a recording device 1700 according to the twelfth embodiment. FIG. 29 is a perspective view of a roll set portion 1750 according to the twelfth embodiment. In order to prevent skewing of the sheet S, the alignment adjustment of the conveyance roller 1005 and the paper-core fixing portion 1011 is needed. However, in the configurations of the embodiments described so far, the conveyance roller 1005 and the paper-core fixing portion 1011 are fixed through a plurality of components, and when the conveyed sheet S is inclined, the alignment adjustment is difficult. Thus, in this embodiment, a position of a guide adjustment portion 1015, which is a connection member which connects the stand 1014 to the holder guide 1003, with respect to the stand 1014, is configured to be capable of being adjusted. By adjusting the position of the guide adjustment portion 1015, a fixed position in the depth direction (Y-direction) and in the vertical direction (Z-direction) of the holder guide 1003 with respect to the stand 1014 can be adjusted. Therefore, by adjusting the position of the guide adjustment portion 1015 with respect to the holder guide 1003, the alignment adjustment of the conveyance roller 1005 and the paper-core fixing portion 1011 is made, whereby the skewing of the sheet S can be prevented. In the recording device 1700, a guide adjustment portion 1015*a* connected to the holder guide 1003*a* on the paper-feed side and a guide adjustment portion 1015*b* connected to the holder guide 1003*b* on the take-up side are provided.

Figure 30B:
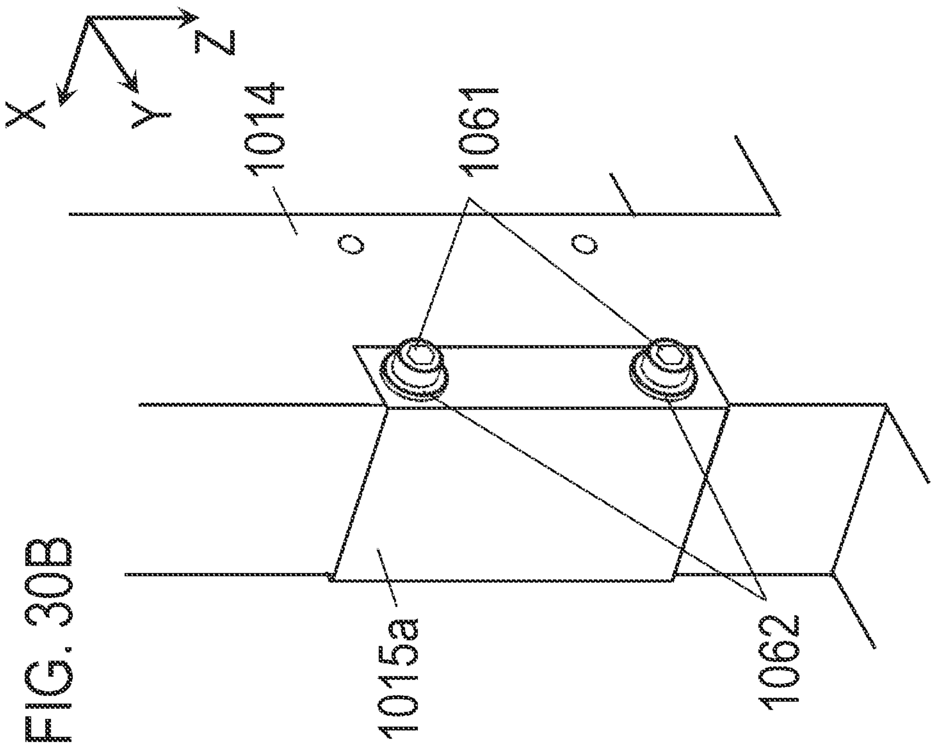
FIGS. 30A and 30B are perspective views illustrating an alignment adjustment mechanism according to the twelfth embodiment.
Figure 30A:
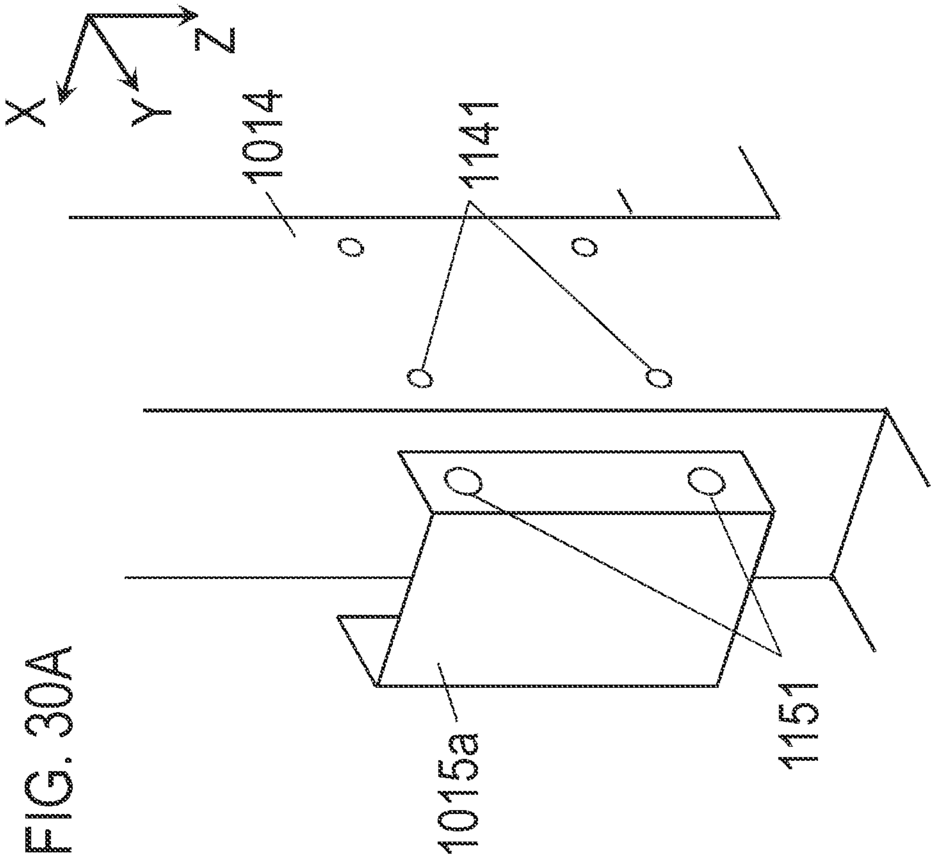

FIG. 30A is a perspective view illustrating the guide adjustment portion 1015*a*, and the stand 1014 in a separated manner, and FIG. 30B is a perspective view illustrating a state in which the guide adjustment portion 1015*a* is fixed to the stand 1014. The position adjustment mechanism in this embodiment includes the guide adjustment portion 1015 in which a mounting hole 1151 is provided and the stand 1014 in which a screw hole 1141 is provided. When a bolt 1061 is inserted into the mounting hole 1151 and the screw hole 1141, and they are tightened by the bolt 1061 through a washer 1062, the guide adjustment portion 1015 is fixed to the stand 1014. The mounting hole 1151 is formed larger than the screw portion of the bolt 1061, and by slightly adjusting the position in the depth direction and the vertical direction of the guide adjustment portion 1015 with respect to the stand 1014, the guide adjustment portion 1015 can be fixed to the stand 1014. That is, if the conveyed sheet S is skewed, the alignment adjustment of the conveyance roller 1005 and the paper-core fixing portion 1011 can be made by adjusting the position of the guide adjustment portion 1015. Note that, if a diameter of a head part of the bolt 1061 is sufficiently larger than the mounting hole 1151, and the guide adjustment portion 1015 can be sufficiently fixed, the washer 1062 does not have to be provided.

In this embodiment, the guide adjustment portion 1015 is provided only on the end part on the non-reference roll holder 1022 side of the holder guide 1003, but it may be configured to be provided on the end part on the reference roll holder 1021 side. That is, as the alignment adjustment mechanism, the position adjustment mechanism such as the guide adjustment portion or the like needs to be provided at least on one end part of the holder guide, but it may be configured to be provided on either one of the reference side and the non-reference side or on both ends on the reference side and the non-reference side.

Thirteenth Embodiment

Figure 32:
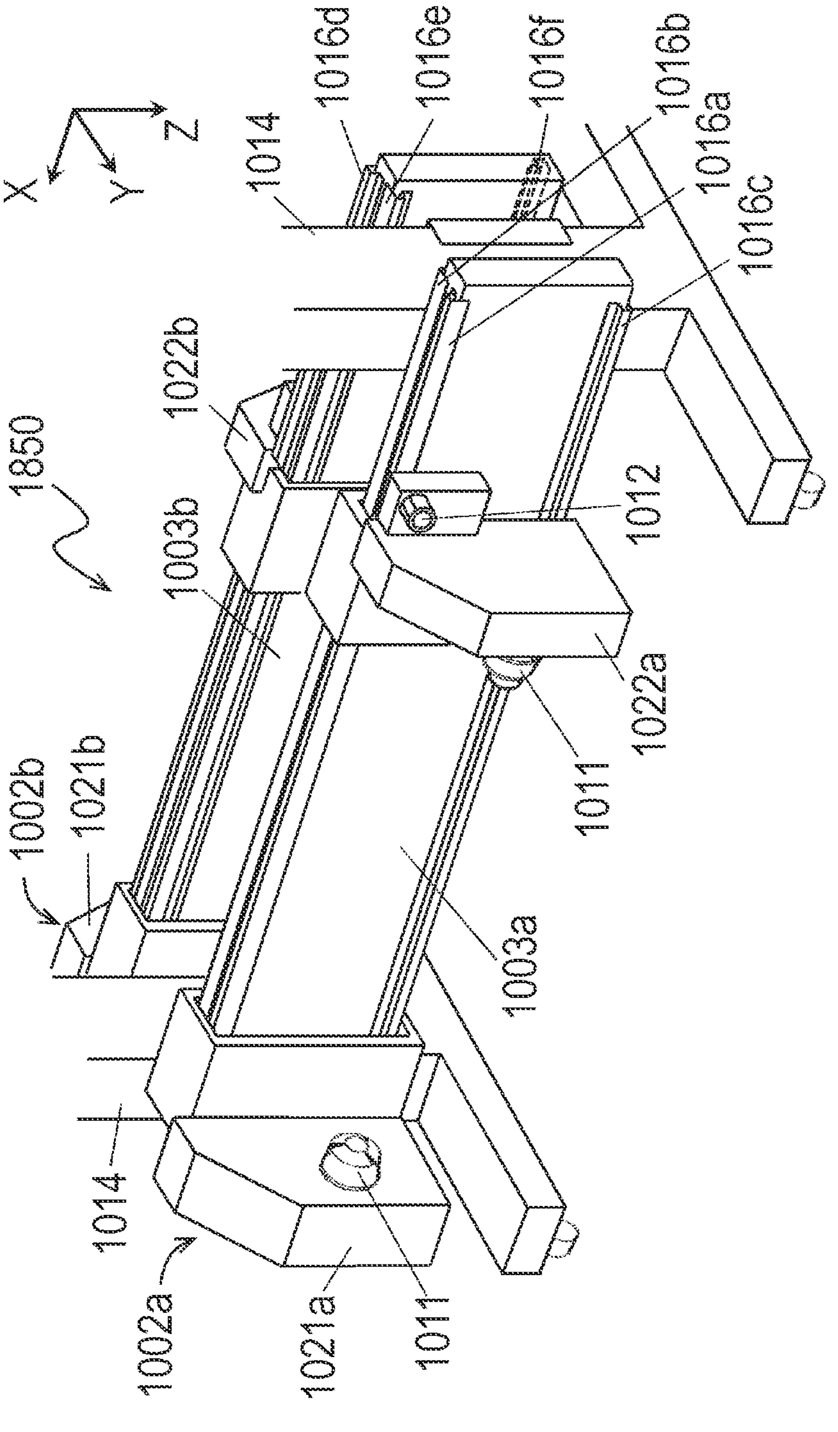
FIG. 32 is a perspective view of a periphery of a roll holder according to the thirteenth embodiment.
Figure 33:
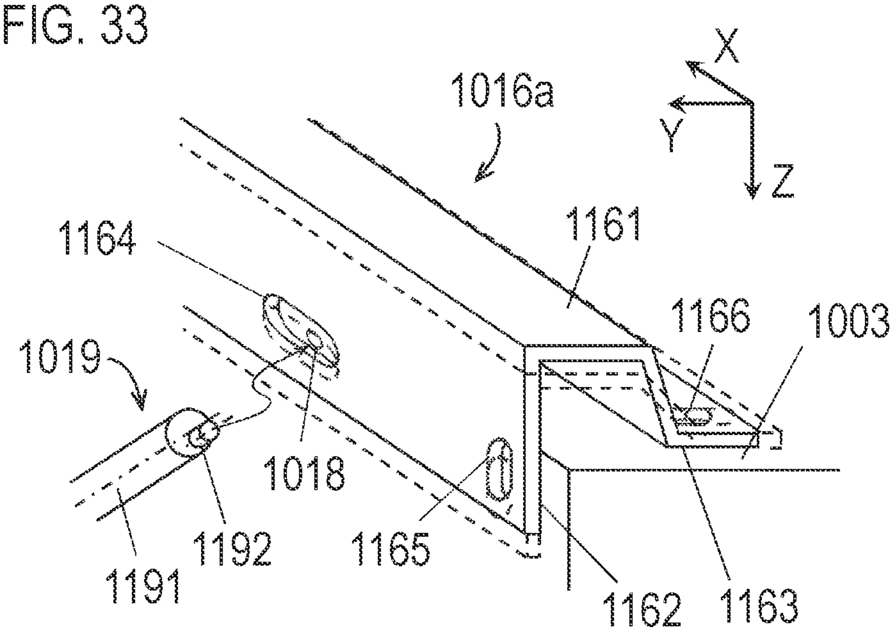
FIG. 33 is a perspective view of a guide adjustment portion according to the thirteenth embodiment.

Subsequently, a thirteenth embodiment will be described by referring to FIGS. 31 to 33. In the thirteenth embodiment, a position adjustment mechanism with a configuration different from that of the twelfth embodiment is provided, and alignment can be adjusted. Note that a difference from the ninth embodiment is mainly described in the following, while the other identical configurations are given the same signs, and the description thereof is omitted.

Figure 31:
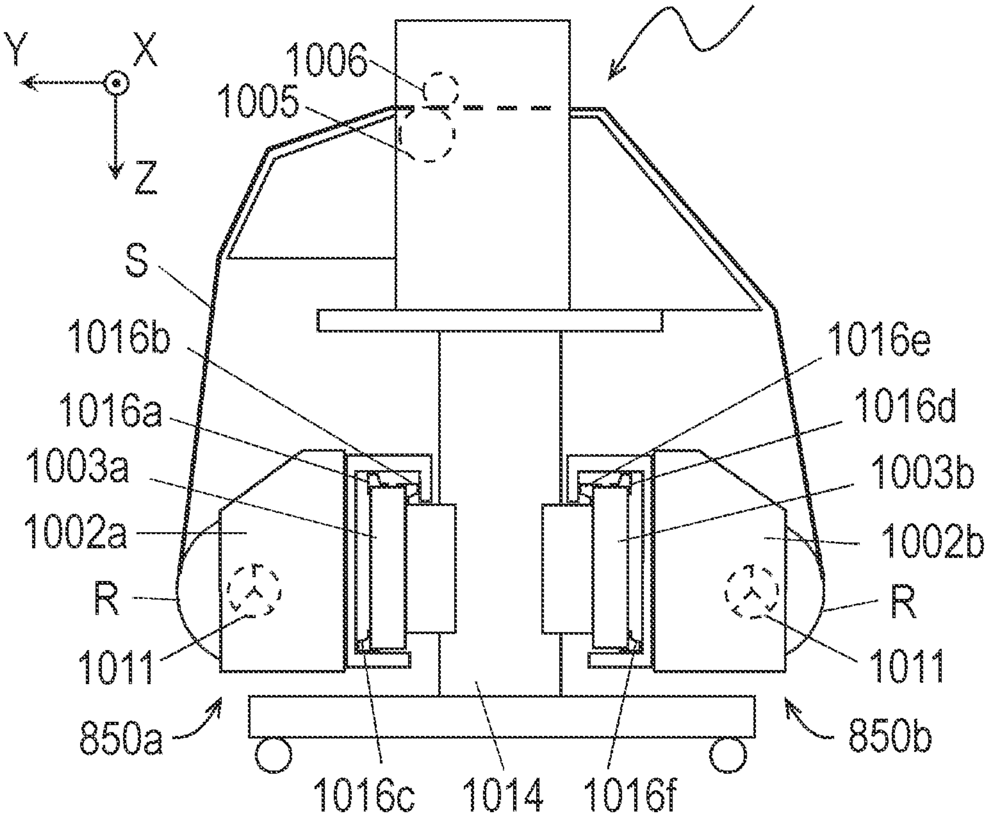
FIG. 31 is a schematic side view of a recording device according to a thirteenth embodiment.

FIG. 31 is a side view of a recording device 1800 according to the thirteenth embodiment. FIG. 32 is a perspective view of a roll set portion 1850 according to the thirteenth embodiment. In a configuration in which the non-reference roll holder 1022 is movable in the width direction, it is preferable that alignment adjustment of the conveyance roller 1005 and the paper-core fixing portion 1011 can be made regardless of the position in the width direction of the non-reference roll holder 1022. Thus, the roll set portion 1850 of this embodiment is configured such that, as the position adjustment mechanism of the roll holder 1002, a plurality of holder sliders 1016 extending in substantially the whole region in the width direction of the holder guide 1003 are provided. That is, the recording device 1800 is configured to be capable of the alignment adjustment of the conveyance roller 1005 and the paper-core fixing portion 1011 substantially the whole region in the width direction of the holder guide 1003 by the holder sliders 1016.

The holder sliders 1016 are provided three each on the respective holder guides 1003 on the paper-feed side and the take-up side and are slide members for the non-reference roll holder 1022*a* on the paper-feed side and the non-reference roll holder 1022*b* on the take-up side to slide in the width direction. The holder guide 1003*a* on the paper-feed side supports the roll holder 1002*a* through the holder slider 1016*a* (first slider), a holder slider 1016*b* (second slider), and a holder slider 1016*c* (third slider). The holder guide 1003*b* on the take-up side supports the roll holder 1002*b* through a holder slider 1016*d*, a holder slider 1016*e*, a holder slider 1016*f*.

The holder slider 1016*a* is provided on an upper end of the holder guide 1003*a* and is in contact with the roll holder 1002*a* upward in the vertical direction (Z-negative direction). The holder slider 1016*b* is provided above and on a depth side in the depth direction of the holder guide 1003*a* and is in contact with the roll holder 1002*a* toward the depth in the depth direction (Y-negative direction). The holder slider 1016*c* is provided below and on a front side in the depth direction of the holder guide 1003*a* and is in contact with the roll holder 1002*a* toward the front in the depth direction (Y-positive direction). By disposing the holder sliders 1016 as above, the roll holder 1002 can be supported so as not to be inclined. Moreover, the depth-direction (Y-direction) position of the roll holder 1002 can be adjusted by the holder slider 1016*b* and the holder slider 1016*c*. Furthermore, the vertical-direction (Z-direction) position of the roll holder 1002 can be adjusted by the holder slider 1016*a*. As described above, by adjusting the position and the attitude of the roll holder 1002 on which the paper-core fixing portion 1011 is provided by the holder sliders 1016, the alignment adjustment of the conveyance roller 1005 and the paper-core fixing portion 1011 can be made.

Subsequently, details of the position adjustment method by the holder sliders 1016 will be described by using the holder slider 1016*a* as an example. FIG. 33 is a perspective view illustrating the adjustment method of the vertical-direction position of the roll holder 1002 by the holder slider 1016*a*. In FIG. 33, the holder slider 1016*a* before the adjustment is indicated by a solid line, and the holder slider 1016*a* after the adjustment is indicated by a dotted line. The holder slider 1016*a* after the adjustment shown in FIG. 31 has been adjusted in a direction in which the vertical-direction position of the roll holder 1002 is adjusted downward.

The holder slider 1016*a* is formed of an elongated plate material bent in the short-side direction and has a plurality of surfaces extending in the width direction. The holder slider 1016*a* has a first surface 1161 in contact with the roll holder 1002, a second surface 1162 in parallel with the first surface 1161 and in contact with the holder guide 1003, and a third surface 1163 orthogonal to the second surface 1162 and in contact with the holder guide 1003. The second surface 1162 is in contact with the holder guide 1003 downward in the vertical direction (Z-positive direction), and the third surface 1163 is in contact with the holder guide 1003 toward the depth in the depth direction (Y-negative direction). The holder slider 1016*a* further has an adjustment long-hole 1164 which penetrates the second surface 1162 and is long in the width direction, a mounting long-hole 1165 which penetrates the second surface 1162 and is long in the vertical direction, and a mounting long-hole 1166 which penetrates the third surface 1163 and is long in the depth direction. By inserting a screw component such as a bolt into a screw hole (not shown) of the holder guide 1003 through the mounting long-hole 1165 and the mounting long-hole 1166, the holder slider 1016*a* is fixed to the holder guide 1003.

For the position adjustment by the holder slider 1016*a*, an adjustment jig 1019 engaged with both a reference hole 1018 provided in the holder guide 1003 and the adjustment long-hole 1164 is used. The reference hole 1018 is located on an inner side of the adjustment long-hole 1164 when viewed from an axial direction of the reference hole 1018. The adjustment jig 1019 has a cylindrical shaft portion 1191 and a pin portion 1192 provided at a distal end of the shaft portion 1191. A center axis of the pin portion 1192 is disposed by being shifted with respect to a center axis of the shaft portion 1191, and the pin portion 1192 is eccentric to the shaft portion 1191. By inserting the pin portion 1192 into the reference hole 1018, by inserting the shaft portion 1191 into the adjustment long-hole 1164, and by rotating the adjustment jig 1019 around the center axis of the pin portion 1192, the adjustment long-hole 1164 is pressed onto the shaft portion 1191 in the vertical direction. That is, by adjusting the adjustment jig 1019 in a state in which the fixing by a screw component inserted into the mounting long-hole 1165 or the mounting long-hole 1166 is relaxed, the vertical-direction position of the first surface 1161 of the holder slider 1016 is adjusted.

When the position of the first surface 1161 in contact with the roll holder 1002 is adjusted, the positions of the second surface 1162 and the third surface 1163 are also changed with respect to the holder guide 1003. For example, when the position of the first surface 1161 is to be adjusted downward, the second surface 1162 is also moved downward, and the third surface moves to the front side in the depth direction. Even in such a case, the mounting long-hole 1165 provided in the second surface 1162 and the mounting long-hole 1166 provided in the third surface 1163 are formed having a long-hole shape so that the holder slider 1016 can be fixed to the holder guide 1003.

By providing a plurality of the reference holes 1018 in the width direction of the holder guide 1003 and by providing a plurality of the adjustment long-holes 1164, the mounting long-holes 1165, and the mounting long-holes 1166 in the width direction of the holder slider 1016*b*, the alignment adjustment in the whole region in the width direction can be made with high accuracy.

The method of adjusting the position of the roll holder 1002 has been described above with the holder slider 1016*b* as an example, but the configurations and the position adjustment methods of the other holder sliders 1016 are also the same. By providing the plurality of holder sliders 1016 with different contact direction with respect to the roll holder 1002 on the holder guide 1003, the alignment adjustment of the conveyance roller 1005 and the paper-core fixing portion 1011 can be made by adjusting the position and the attitude of the roll holder 1002.

Note that the application of the present invention is not limited to the embodiments described above. The configuration of each embodiment may be freely combined such as a configuration capable of reducing the sliding resistance at slide and of performing the alignment adjustment by providing the holder roller shown in the eleventh embodiment and the holder slider 1016 shown in the thirteenth embodiment, for example.

Examples of configurations or concepts disclosed in this embodiment described above are shown below. However, these are only exemplification, and the configurations or concepts shown below by the disclosure of this embodiment described above are not limiting.

Configuration B1

A sheet supply device that rotates a roll around which a sheet is wound while supporting the same and sends out the sheet, comprising:

a first roll support portion which rotatably supports the roll on one end side in a width direction of the roll;

a second roll support portion which is provided to face the first roll support portion and rotatably supports the roll on the other end side of the roll; and a guide portion which extends in the width direction and movably supports the second roll support portion in the width direction, wherein below a first space in which the roll between the first roll support portion and the second roll support portion is installed, a second space into which a cart which transports the roll enters is formed.

Configuration B2

The sheet supply device described in the configuration B1, wherein the guide portion is located on a downstream side in an entry direction of the cart with respect to the first space.

Configuration B3

The sheet supply device described in the configuration B2, wherein the second roll support portion has a roller portion in contact with the guide portion and rotatable around a rotation axis extending in a direction orthogonal to the width direction.

Configuration B4

The sheet supply device described in the configuration B3, wherein the roller portion includes a first roller in contact with the guide portion from an upper side in a vertical direction, a second roller in contact with the guide portion from a downstream side in the entry direction, and a third roller in contact with the guide portion below the second roller from an upstream side in the entry direction.

Configuration B5

The sheet supply device described in any one of the configuration B2 to B4, further comprising:

a guide support portion which supports the guide portion; and a position adjustment mechanism capable of adjusting a position in the entry direction and a vertical direction of at least either one of the first roll support portion and the second roll support portion with respect to the guide support portion.

Configuration B6

The sheet supply device described in the configuration B5, wherein the position adjustment mechanism includes a connection member which connects the guide portion and the guide support portion and can adjust the position in the entry direction and the vertical direction of at least either one of the first roll support portion and the second roll support portion with respect to the guide support portion.

Configuration B7

The sheet supply device described in the configuration B5, wherein the position adjustment mechanism includes a slide member which extends in the width direction, is provided on the guide portion, and can adjust the position in the entry direction and the vertical direction of at least either one of the first roll support portion and the second roll support portion with respect to the guide portion by being brought into contact with the second roll support portion.

Configuration B8

The sheet supply device described in the configuration B7, wherein the slide member includes a first slider provided on an upper end of the guide portion, a second slider provided on a downstream side in the entry direction with respect to the guide portion, and a third slider provided below the second slider and on an upstream side in the entry direction with respect to the guide portion.

Configuration B9

A recording device, comprising:

a sheet supply device that rotates a roll around which a sheet is wound while supporting the same and sends out the sheet; and a recording portion which performs a recording operation on the sheet sent out of the sheet supply device, wherein the sheet supply device includes:

a first roll support portion which rotatably supports the roll on one end side in a width direction of the roll;

a second roll support portion which is provided to face the first roll support portion and rotatably supports the roll on the other end side of the roll; and a guide portion which extends in the width direction and movably supports the second roll support portion in the width direction, wherein below a first space in which the roll between the first roll support portion and the second roll support portion is installed, a second space into which a cart which transports the roll enters is formed.

Configuration B10

The recording device described in the configuration B9, wherein the recording device further includes:

a third roll support portion which rotatably supports the roll on the one end side of the roll; and a fourth roll support portion which is provided to face the third roll support portion and rotatably supports the roll on the other end side of the roll, wherein the sheet for which the recording operation was performed is taken up by the roll installed between the third roll support portion and the fourth roll support portion.

Configuration B11

The recording device described in the configuration B10, wherein a rotation center of a roll supported by the first roll support portion and the second roll support portion matches a rotation center of a roll supported by the third roll support portion and the fourth roll support portion in height.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017460, filed on Feb. 7, 2022, and Japanese Patent Application No. 2022-029174, filed on Feb. 28, 2022, which are hereby incorporated by reference herein in their entirety.

What is claimed is:

1. A recording device, comprising:

a recording portion configured to record images on a sheet supplied from a roll on which the sheet is wound;

a first roll support portion which rotatably supports the roll at a front side of the recording device for supplying the sheet to the recording portion on one end side in a width direction of the roll;

a second roll support portion which is provided to face the first roll support portion and rotatably supports the roll at the front side of the recording device for supplying the sheet to the recording portion on the other end side of the roll; and a guide portion which extends in the width direction at a backside, in a horizontal direction, of the roll supported by the first roll support portion and the second roll support portion and movably supports the second roll support portion in the width direction, wherein the second roll support portion has a roller portion in contact with the guide portion and being rotatable around a rotation axis extending in a direction orthogonal to the width direction, and wherein the roller portion includes a first roller in contact with the guide portion from an upper side in a vertical direction, a second roller in contact with the guide portion from a rear side with respect to the front side, and a third roller in contact with the guide portion below the second roller from a fore side with respect to the rear side.

2. The recording device according to claim 1, wherein the recording device further includes:

a third roll support portion which rotatably supports another roll on the one end side of the other roll; and a fourth roll support portion which is provided to face the third roll support portion and rotatably supports the other roll on the other end side of the other roll, and wherein the sheet for which the recording operation was performed is taken up by the other roll installed between the third roll support portion and the fourth roll support portion.

3. The recording device according to claim 2, wherein a rotation center of the roll supported by the first roll support portion and the second roll support portion matches a rotation center of the other roll supported by the third roll support portion and the fourth roll support portion in height.

4. The recording device according to claim 1, wherein below a first space in which the roll between the first roll support portion and the second roll support portion is installed, a second space into which a cart which transports the roll can enter is formed.

5. The recording device according to claim 4, wherein the guide portion is located on a downstream side in an entry direction of the cart with respect to the first space.

6. The recording device according to claim 5, further comprising:

a guide support portion which supports the guide portion; and a position adjustment mechanism capable of adjusting a position in the entry direction and a vertical direction of at least one of the first roll support portion and the second roll support portion with respect to the guide support portion.

7. The recording device according to claim 6, wherein the position adjustment mechanism includes a connection member which connects the guide portion and the guide support portion and can adjust the position in the entry direction and the vertical direction of at least either one of the first roll support portion and the second roll support portion with respect to the guide support portion.

8. The recording device according to claim 6, wherein the position adjustment mechanism includes a slide member which extends in the width direction, is provided on the guide portion, and can adjust the position in the entry direction and the vertical direction of at least either one of the first roll support portion and the second roll support portion with respect to the guide portion by being brought into contact with the second roll support portion.

9. The recording device according to claim 8, wherein the slide member includes a first slider provided on an upper end of the guide portion, a second slider provided on a downstream side in the entry direction with respect to the guide portion, and a third slider provided below the second slider and on an upstream side in the entry direction with respect to the guide portion.

10. The recording device according to claim 1, further comprising:

a first stand configured to support the recording portion at the first roll support portion side; and a second stand configured to support the recording portion at the second roll support portion side, wherein the guide portion is attached to the first stand and the second stand.

11. The recording device according to claim 1, further comprising:

a lock mechanism configured to fix the second roll support portion to the guide portion.

12. The recording device according to claim 1, further comprising:

a roll drive motor configured to rotate the roll at the first roll support portion side.

13. The recording device according to claim 1, wherein the recording portion is an inkjet type printhead.

* * * * *